(12) United States Patent
Annacone et al.

(10) Patent No.: US 6,609,662 B2
(45) Date of Patent: Aug. 26, 2003

(54) DEBIT CARD HAVING SECURE SCRATCH-OFF LABEL STRIP WITH RELEASABLE LAYER AND METHOD OF APPLYING SAME

(75) Inventors: William R. Annacone, Stowe, VT (US); Kenneth P. Felis, Stowe, VT (US); Vincent Kubert, Melbourne, FL (US)

(73) Assignee: Profold, Inc., Sebastian, FL (US)

( * ) Notice: Subject to any disclaimer, the term of this patent is extended or adjusted under 35 U.S.C. 154(b) by 0 days.

(21) Appl. No.: 09/827,326

(22) Filed: Apr. 5, 2001

(65) Prior Publication Data

US 2002/0020739 A1 Feb. 21, 2002

Related U.S. Application Data

(63) Continuation-in-part of application No. 09/705,136, filed on Nov. 2, 2000, which is a continuation of application No. 09/496,096, filed on Feb. 1, 2000, now Pat. No. 6,199,757.

(51) Int. Cl.⁷ ............................................... G06K 19/00
(52) U.S. Cl. ....................................... 235/487; 235/380
(58) Field of Search ................................... 235/487, 380

(56) References Cited

U.S. PATENT DOCUMENTS

| | | |
|---|---|---|
| 2,145,334 A | 1/1939 | Bergstein |
| 2,781,618 A | 2/1957 | Beckman et al. |
| 3,966,193 A | 6/1976 | Storace et al. |
| 4,119,194 A | 10/1978 | Freeman et al. |
| 4,121,403 A | 10/1978 | Bogdanski et al. |
| 4,140,627 A | 2/1979 | Weller et al. |
| 4,183,779 A | 1/1980 | Barber et al. |
| 4,278,488 A | 7/1981 | Kopacz et al. |
| 4,588,463 A | 5/1986 | Barber et al. |
| 4,606,715 A | 8/1986 | Larson |
| 4,621,798 A | 11/1986 | Akers |
| 4,669,719 A | 6/1987 | Fratangelo |
| 4,701,238 A | 10/1987 | Boucher |

(List continued on next page.)

FOREIGN PATENT DOCUMENTS

| | | |
|---|---|---|
| EP | 0 326 724 | 9/1989 |
| EP | 0 896 296 | 10/1999 |
| FR | 2 780 339 | 12/1999 |
| WO | WO 99/16566 | 8/1999 |

OTHER PUBLICATIONS

Patent Abstracts of Japan, vol. 1998, No. 13, Nov. 30, 1998, and JP 10 214320A (Dainippon Printing Co., Ltd.), Aug. 11, 1996, one page.

Patent Abstracts of Japan, vol. 1996, No. 11, Nov. 29, 1995, and JP 192593A (Dainippon Printing Co., Ltd.), Jul. 30, 1995, one page.

*Primary Examiner*—Harold I. Pitts
(74) *Attorney, Agent, or Firm*—Allen, Dyer, Doppelt, Milbrath & Gilchrist, P.A.

(57) ABSTRACT

A telephone calling card includes a planar card member with a scratch-off label positioned on a surface of the planar card member. The scratch-off label includes a base label having an opaque, releasable film layer and a PIN printed on the opaque, releasable film layer. A scratch-off cover label is secured on the base label and has a scratch-off layer that covers the PIN to obscure from viewing the PIN. Upon application of a peeling force to remove the scratch-off cover label, the opaque, releasable film layer is removed and hides the printed PIN from viewing via the backside of the opaque, releasable film layer. In one aspect of the present invention, the scratch-off cover label is folded over the base label.

43 Claims, 18 Drawing Sheets

U.S. PATENT DOCUMENTS

| | | |
|---|---|---|
| 4,738,473 A | 4/1988 | Meloni et al. |
| 4,750,966 A | 6/1988 | Koller |
| 4,787,950 A | 11/1988 | Meloni et al. |
| 4,795,042 A | 1/1989 | Klein et al. |
| 4,930,764 A | 6/1990 | Holbrook et al. |
| 4,955,483 A | 9/1990 | O'Dea et al. |
| 4,971,686 A | 11/1990 | O'Den et al. |
| 4,973,037 A | 11/1990 | Holbrook |
| 5,114,137 A | 5/1992 | Olson |
| 5,214,901 A | 6/1993 | Milliner |
| 5,294,100 A | 3/1994 | Scheibelhut |
| 5,393,366 A | 2/1995 | Bell |
| 5,398,922 A | 3/1995 | Malatesta |
| 5,504,808 A | 4/1996 | Hamrick, Jr. |
| 5,595,044 A | 1/1997 | Kataigi |
| 5,629,977 A | 5/1997 | Fonseca |
| 5,630,899 A | 5/1997 | Meschi |
| 5,640,447 A | 6/1997 | Fonseca |
| 5,673,309 A | 9/1997 | Woynoski et al. |
| 5,891,300 A | 4/1999 | Oussani, Jr. et al. |
| 5,918,909 A | 7/1999 | Fiala et al. |
| 6,028,920 A | 2/2000 | Carson |
| 6,173,901 B1 | 1/2001 | McCannel |
| 6,199,757 B1 * | 3/2001 | Kubert ........................ 238/487 |

* cited by examiner

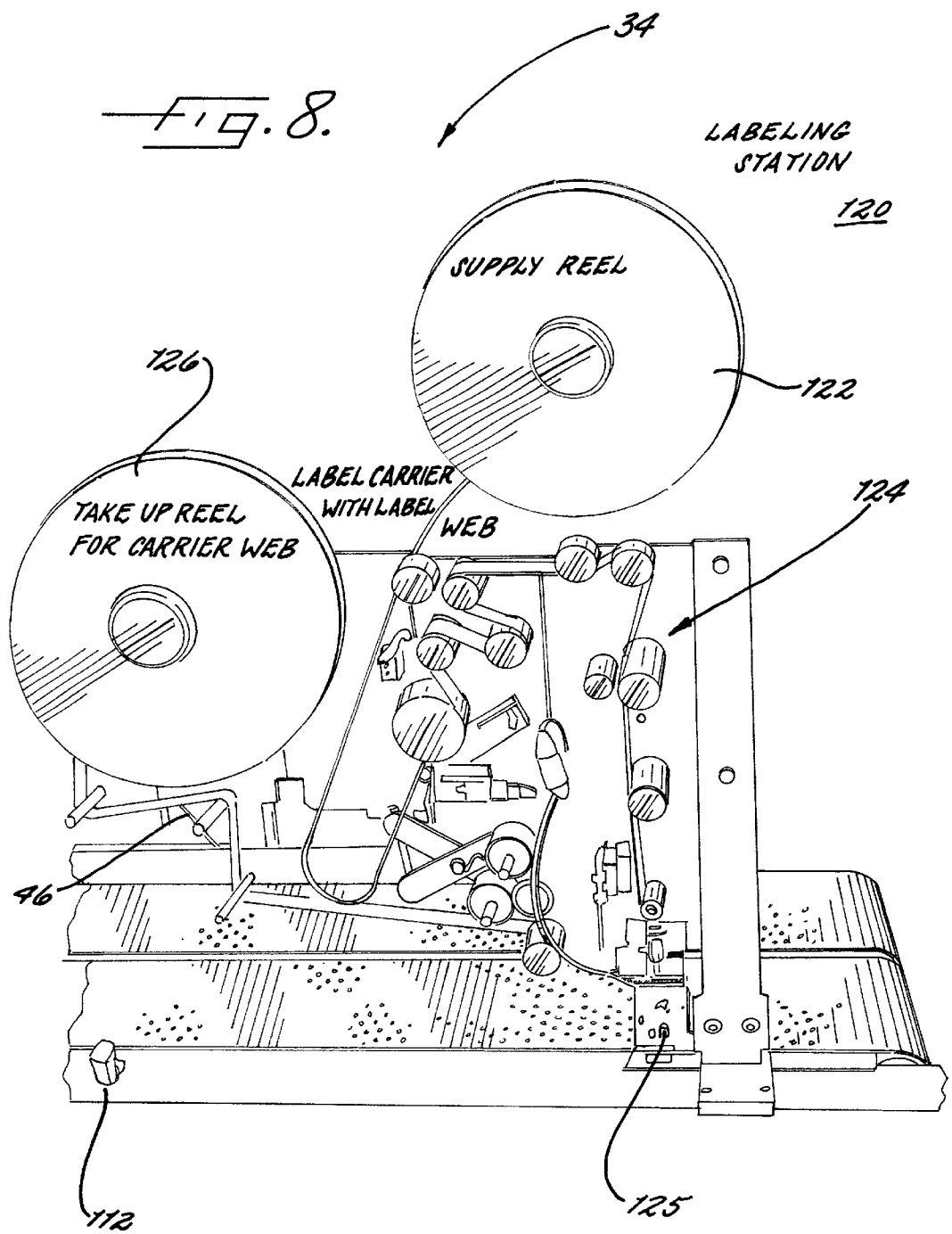

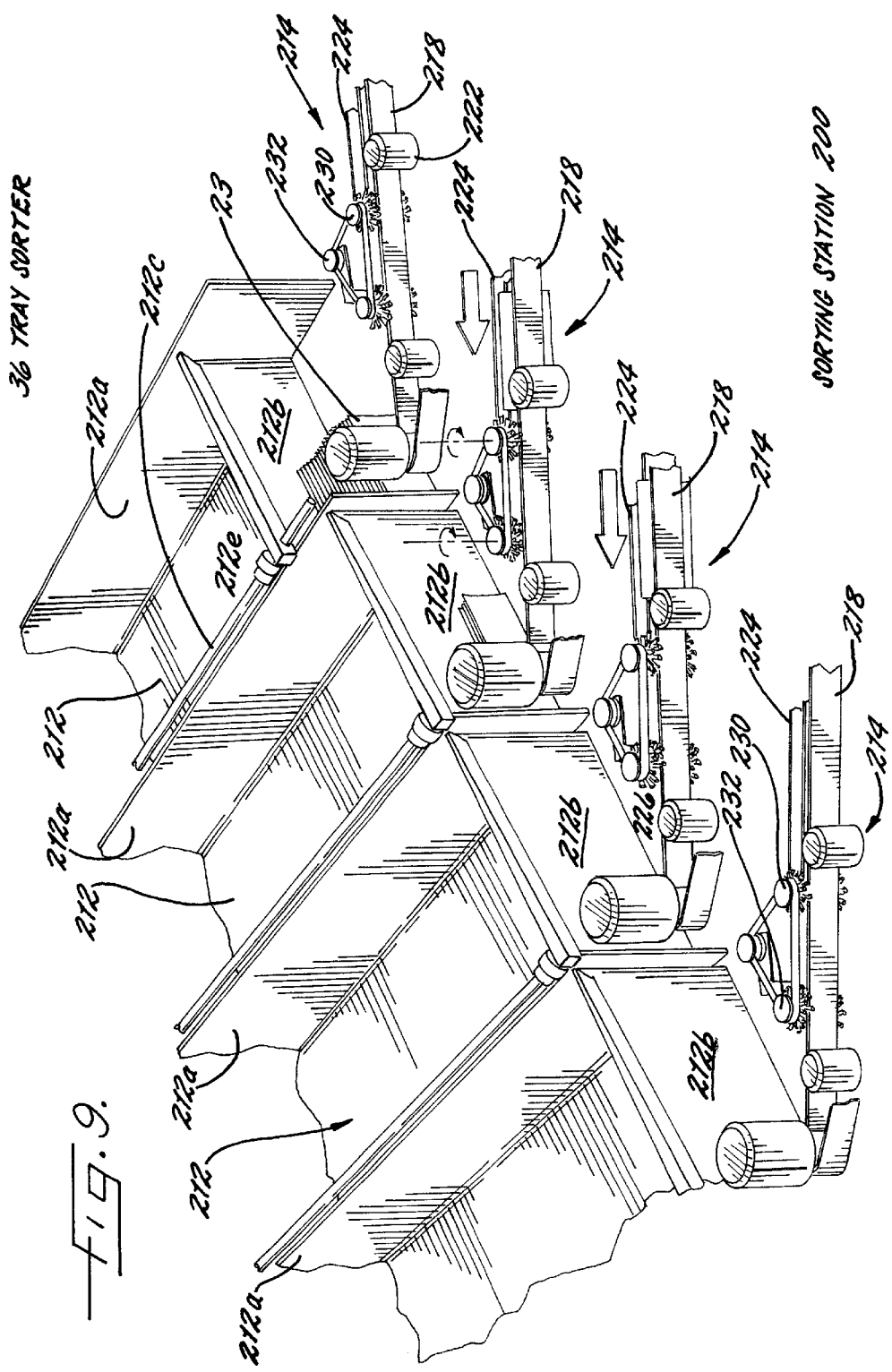

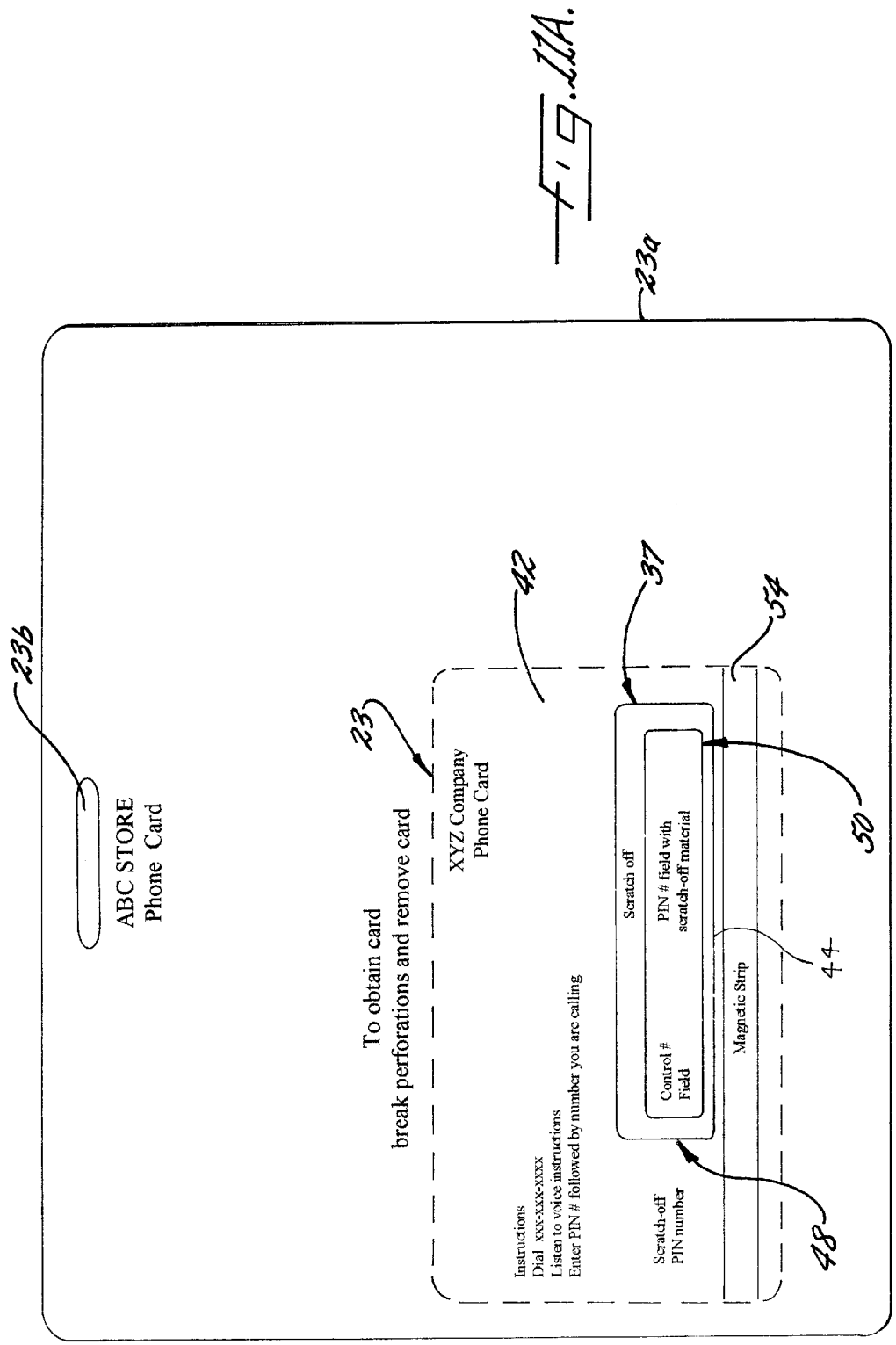

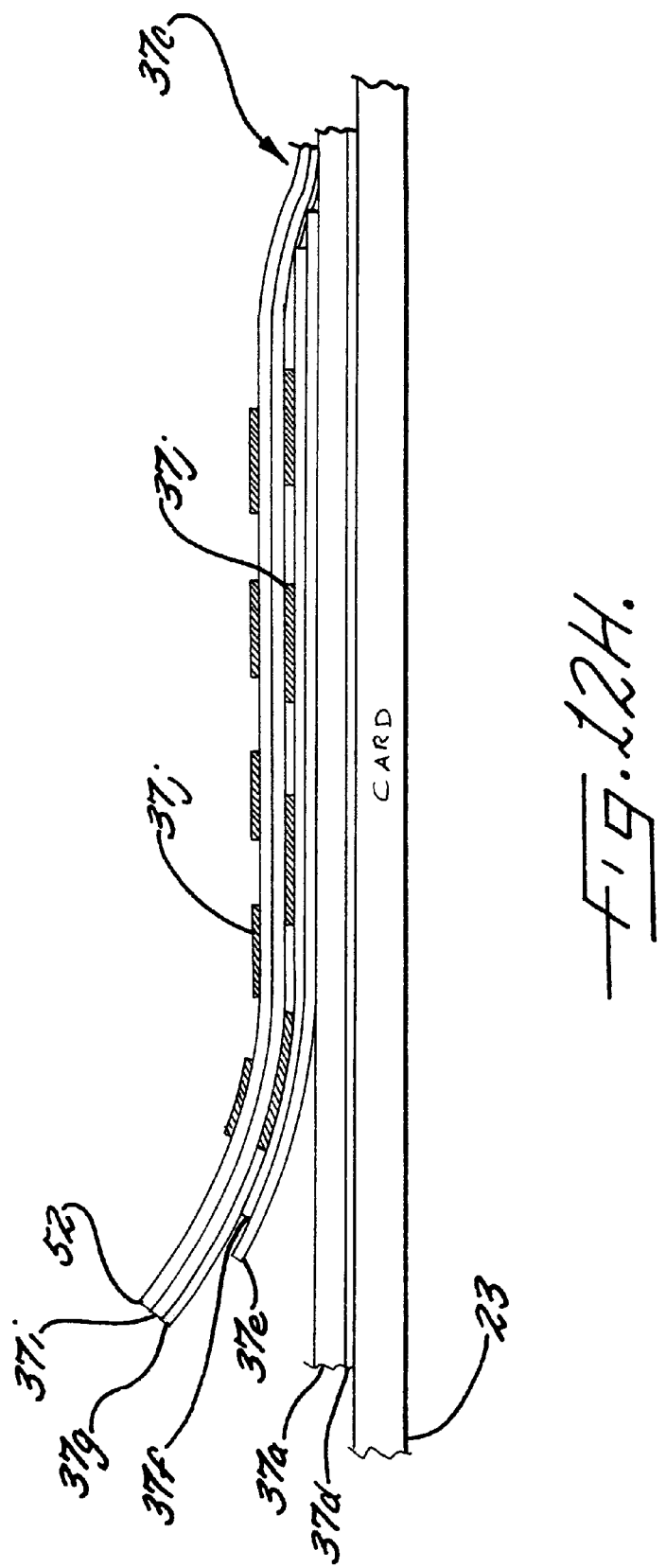

DEBIT CARD HAVING SECURE SCRATCH-OFF LABEL STRIP WITH RELEASABLE LAYER AND METHOD OF APPLYING SAME

RELATED APPLICATIONS

This application is a continuation-in-part of U.S. patent application Ser. No. 09/705,136 filed Nov. 2, 2000, which is a continuation of U.S. patent application Ser. No. 09/496,096, filed Feb. 1, 2000, now U.S. Pat. No. 6,199,757, the disclosures which are hereby incorporated by reference in their entirety.

FIELD OF THE INVENTION

This invention relates to debit cards, such as telephone calling cards, and more particularly, this invention relates to debit cards having personal identification numbers (PIN).

BACKGROUND OF THE INVENTION

In the incorporated by reference '136 patent application and the '757 patent, telephone calling cards and debit cards can be processed in an automated manner very quickly while also having a PIN (personal identification number) and optional control code applied onto the debit card or telephone calling card in an efficient manner. The PIN and the optional control code are applied without the drawbacks of having one or two printing steps and any control number accidentally covered under high speed operating conditions.

In the copending application, a debit card or telephone calling card includes a planar card member having front and rear surfaces. A scratch-off label strip is adhered to a surface of the planar card member and in one aspect, the rear surface. This scratch-off label strip has opposing sides. One side is adhered onto the planar card member, and the other side has a PIN code field containing a printed PIN (personal identification number) thereon. A scratch-off layer covers the PIN code field to obscure from viewing the PIN code. The scratch-off label strip includes a base label layer that had been removed from a carrier web during an automated labeling process and applied onto the card.

An optional control code field is positioned adjacent the PIN code field. The scratch-off layer covers only the PIN code field. This optimal control code field can include a bar code or an array of dots. This planar card member is preferably rectangular configured and wallet sized. An adhesive can be positioned on one side of the scratch-off label strip and could be a self-adhesive.

This type of construction may not always provide foolproof security depending on the types of labels used as the base label. For example, some of the debit cards, and especially the telephone calling cards, are worth as much as $500 or more. Some thieves will freeze the cards and remove the scratch-off label from the card, revealing the PIN. For example, once the underlying base layer is removed from the card, one could see the PIN by viewing the label from the side that had been attached onto the telephone calling card. Thus, it is possible to steal a PIN number by freezing the card and removing the scratch-off label. The PIN could be copied and the scratch-off label reapplied. Afterwards, it would appear to an ordinary observer and others that the card had never been tampered. A solution to this type of tampering is necessary because of the large number of telephone calling cards and similar debit cards that are produced and the concomitant high dollar amounts involved with such cards.

SUMMARY OF THE INVENTION

It is therefore an object of the present invention to provide a debit card, such as a telephone calling card, which has enhanced security such that even if a scratch-off label were removed or tampered, the PIN code could not be revealed.

It is still another object of the present invention to provide a telephone calling card or debit card that has enhanced security with the scratch-off label.

In accordance with the present invention, a telephone calling card, and in one aspect of the present invention a debit card, such as a credit card or telephone calling card, includes a planar card member with a scratch-off label positioned on a surface of the planar card member. This scratch-off label comprises a base label having an opaque, releasable film layer positioned thereon and a PIN (personal identification number) printed on the opaque, releasable film layer. A scratch-off cover label is secured on the base label. A scratch-off layer covers the PIN to obscure from viewing the PIN. Upon application of a peeling force to remove the scratch-off cover label, an opaque, releasable film layer is removed and hides the printed PIN from viewing via the backside of the opaque, releasable film layer.

In another aspect of the present invention, the base label includes an adhesive for retaining the base label onto the planar card member. A protective release film can be adhered to the adhesive and the release film can be part of a carrier web for automatic application of scratch-off labels in sequence. The adhesive, in yet another aspect of the invention, comprises a pressure sensitive adhesive. In yet another aspect of the present invention, the base label comprises a styrene film. The base label includes a paper label and the releasable film layer includes a plastic film positioned on the base label. The plastic film can include an opaque ink printed thereon, with the PIN printed on the opaque ink. The releasable film layer preferably comprises an opaque ink layer. The scratch-off cover layer preferably comprises a substantially clear plastic film. In yet another aspect of the present invention, an adhesive is positioned on one side of the clear plastic film for retaining the scratch-off label onto the base label. A scratch-off layer is positioned on the opposite side. A control code field is positioned adjacent the PIN. The scratch-off layer covers only the PIN.

In yet another aspect of the invention, an authenticator is positioned on the scratch-off cover label, which could be a hologram, a bar code, or series of authenticating dots. The planar card member is preferably rectangular configured and wallet-sized.

In a method aspect of the present invention, a method of applying a PIN (personal identification number) onto a debit card comprises the steps of supplying a batch of planar card members and feeding the cards into a labeling station, and at that labeling station, applying a scratch-off label that includes a base label having an opaque, releasable film layer positioned thereon. A PIN (personal identification number) is printed on the opaque, releasable film layer. The scratch-off label also includes a scratch-off cover label secured on the base label. It has a scratch-off layer that covers the PIN to obscure from viewing the PIN. Upon application of a peeling force to remove the scratch-off cover label, the opaque, releasable film layer is removed and hides the printed PIN from viewing via the backside of the opaque, releasable film layer.

BRIEF DESCRIPTION OF THE DRAWINGS

Other objects, features and advantages of the present invention will become apparent from the detailed description of the invention which follows, when considered in light of the accompanying drawings in which:

FIG. 8 is a schematic, side elevation view of a labeler that can be used for applying the scratch-off label or scratch-off label components to an article such as a telephone calling card.

FIG. 9 is a perspective view of a tray sorter showing a plurality of article bins and feed belt assemblies.

FIG. 11A shows the rear side of a planar card carrier member having a telephone calling card secured by perforations.

FIG. 12H is a sectional view taken along line H-H of FIG. 12F and showing the scratch-off label of the present invention as applied onto a telephone calling card or debit card.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention is advantageous and provides a telephone calling card or similar debit card with enhanced security, such that even if the scratch-off label strip were removed, such as by freezing or being tampered with, the PIN could not be revealed to a possible thief. Thus, large dollar amounts are saved and manufacturers of telephone calling cards and debit cards have enhanced security and confidence in their end product. By using a base label that is opaque with an opaque, releasable film layer, such as a plastic film and opaque ink, if the scratch-off cover label is removed, the releasable film layer is removed and hides the printed PIN from viewing via the backside of the opaque, releasable film layer. This is advantageous and efficient in use.

Figure 1:
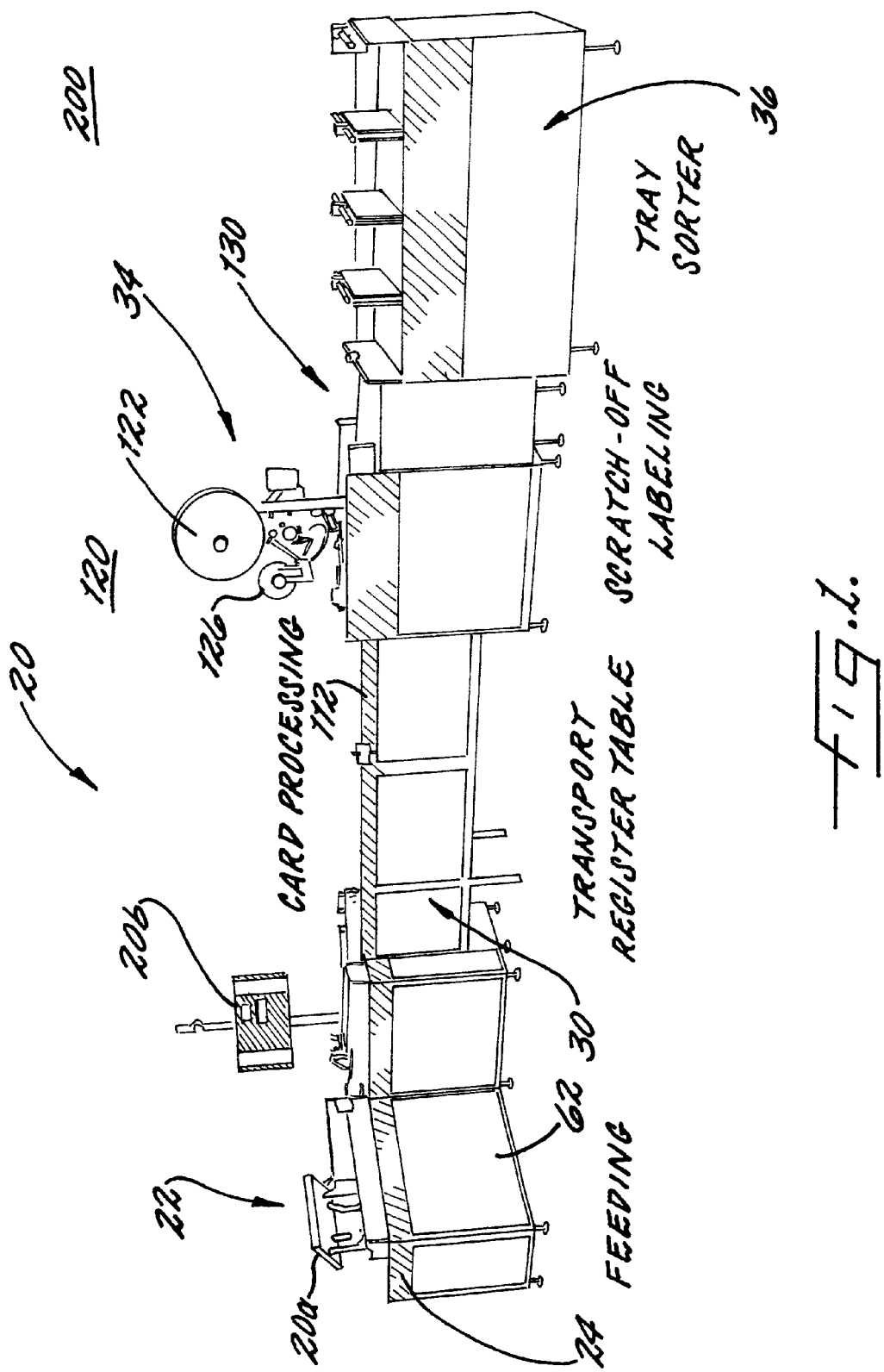
FIG. 1 is an overall perspective view of an automated card processing system of the present invention showing an article feeder, a transport register table, a scratch-off labeling station, and a tray sorter.
Figure 2:
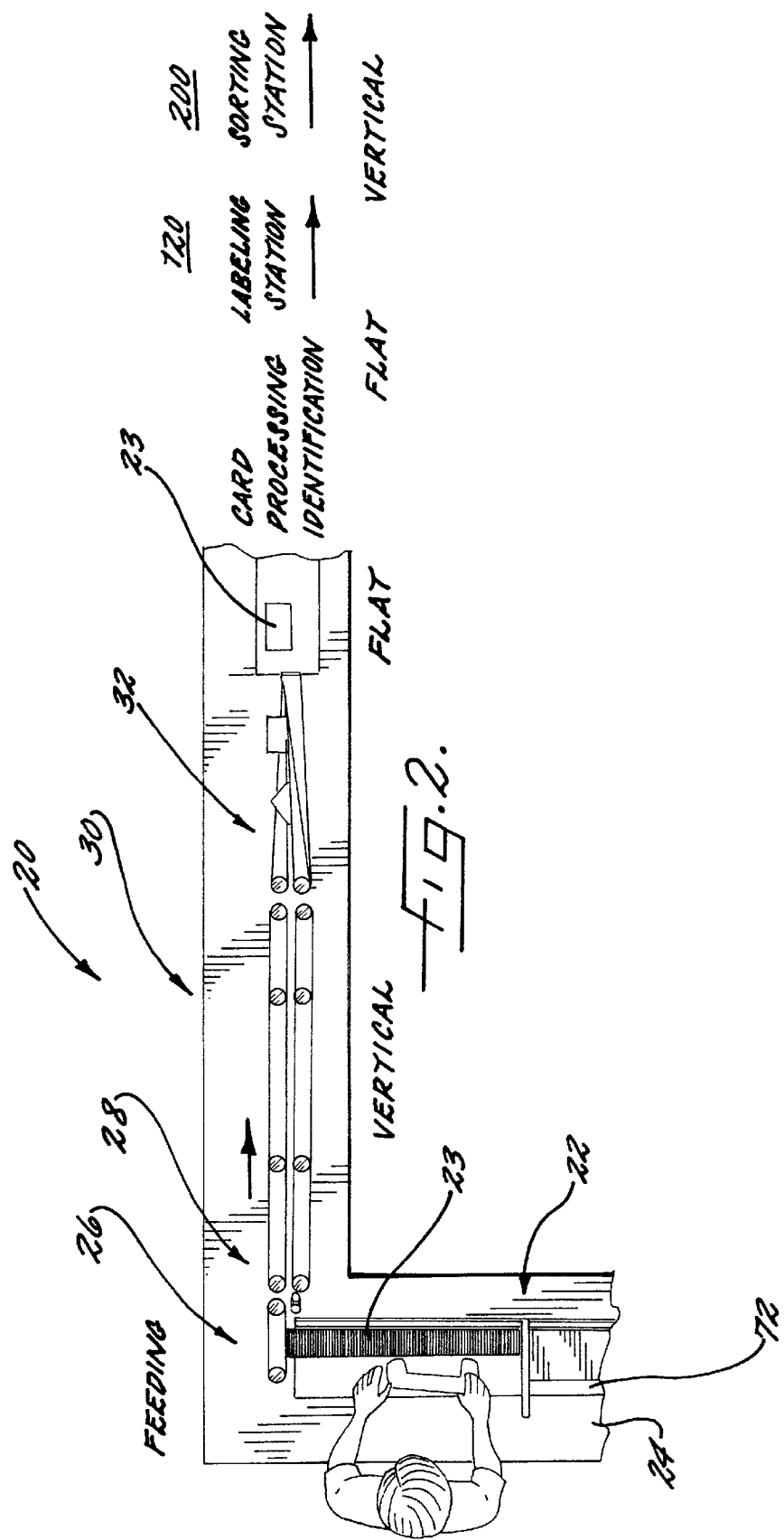
FIG. 2 is a fragmentary plan view of the automated card processing system showing the feeder, transport register table, the general location of labeling and sorting stations, and the locations where a debit card or other article is oriented vertical (standing up), flat and then vertical during processing.

FIG. 1 shows an overall perspective view of an automated card processing system 20 that can be used with the present invention. A controller 20a controls the article feed and controller 20b and controls subsequent processing. FIG. 2 illustrates a fragmentary plan view of the system 20 with an article feeder 22 storing a large plurality of cards, such as wallet sized debit cards. These are illustrated as telephone calling cards 23, stacked in a feeder bin 24. The description relative to the drawings describe only one example of an apparatus and method that can be used for practicing the present invention. Other apparatus and methods as suggested by those skilled in the art are possible.

FIG. 11A shows a telephone calling card that can be contained within a card carrier member, illustrated at 23a. The actual telephone calling card can be perforated and separated from the card carrier member. For example, in the initial processing of a rigid and planar hard plastic material that would form the card carrier member, the actual telephone calling card can be outlined by perforations. Later, the card carrier member can be processed to place information on the area within the perforations that form the telephone calling card. A plurality of card carrier members can then be stacked within the article feeder and feeder bin 24, and processed in a manner as will be described below. Although the description will apply to wallet sized telephone calling cards, it should be understood that the card carrier member as shown in FIG. 11A can also be processed, and may be a preferred manner for processing. Thus, many different types of card carrier members having different dimensions, widths and heights can be processed.

It is possible to have a card carrier member that includes one or more telephone calling cards or other debit cards that could also later be stamped out instead of broken by perforations. Also, the card carrier member could be printed with a designation, such as the card origin, i.e., "ABC Store," to indicate the source of a telephone calling card. The card carrier members can be displayed at a point-of-purchase display such as hanging the card carrier member via the open slot 23b onto a post of a point-of-purchase display within a store. The card carrier member can then be fed in a vertical orientation followed by turning into the flat or laid-down configuration for processing, such as labeling, and then turned and stood back up in a vertical, standing-up orientation for sorting, as will be explained below.

The cards are then fed against a stripper belt mechanism 26 (FIG. 2) and discharged one at a time in a vertical, i.e., standing up orientation, in what is termed as a singulated manner via a feed discharge belt assembly 28 processing area, which includes a transport register table 30, which could include an associated air transport table.

As shown in FIG. 2, the article is laid flat by a twisted belt feed section 32, which orients the card 90° to lay the card flat. With the telephone calling card 23 of the present invention, the telephone calling card can be processed and identified, and encoded, in some instances. The card or card carrier member 23a can advance while laying flat onto an air transport table having an associated scratch-off labeler 34 that applies a scratch-off label 27 onto the phone card or applies associated components of the scratch-off label, such as a base label, PIN code, scratch-off cover label and scratch-off layer. The telephone calling card moves into a tray sorter 36, as shown in FIG. 9, which includes a plurality of article bins 212 where the cards or other articles are stacked, as will be explained below.

Figure 10:
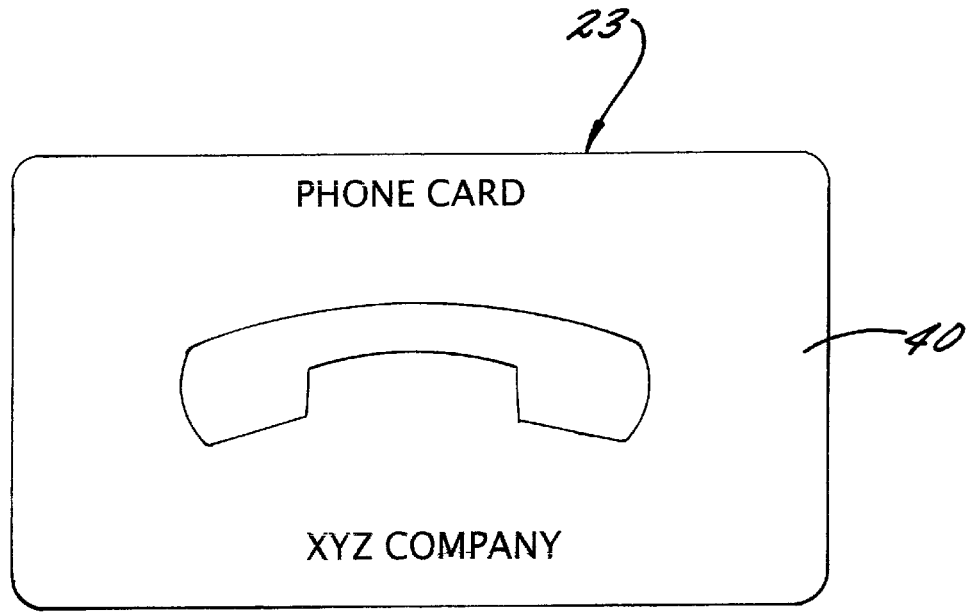
FIGS. 10 and 11 show the front and rear (reverse) sides of a telephone calling card of the present invention having a scratch-off label applied on the rear face.
Figure 11:
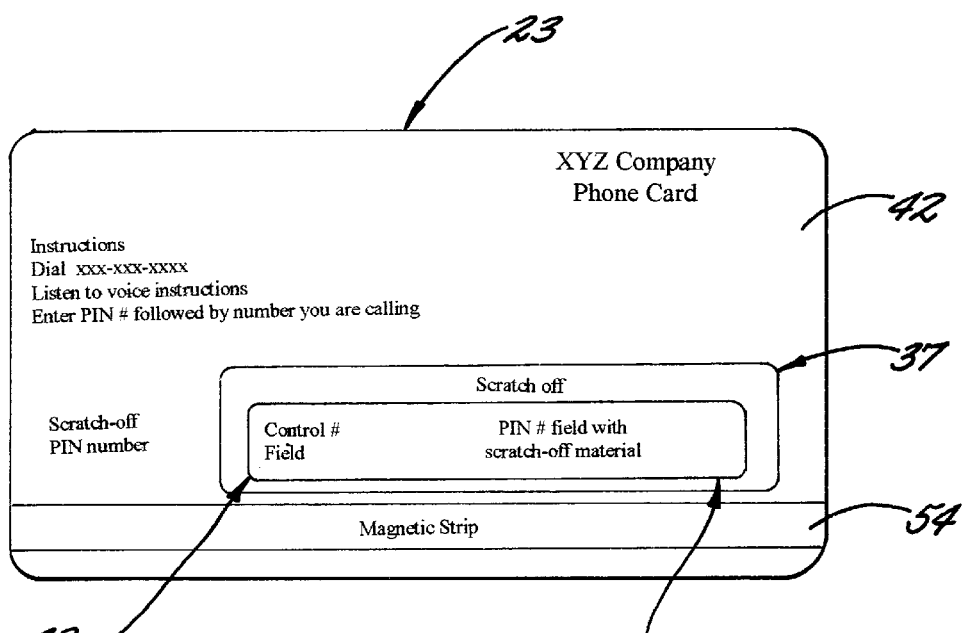

FIGS. 10 and 11 show an example of the telephone calling card 23 having a scratch-off label 37 applied onto the rear face. The telephone calling card is of a type such as issued by various telephone and other companies. The telephone calling card is preferably wallet sized and formed of a rigid plastic material. Although the card is illustrated as a telephone calling card, it could be a credit card, debit phone card, or other similar type of debit card.

The telephone calling cards are common in the United States and in many Latin American countries, where the telephone calling cards can be used without having to establish accounts or billing connections with a telephone company. The telephone calling card 23 can include on its front face 40 (FIG. 10) the identification of a phone card company, such as XYZ Company. The rear or back face 42 typically includes instructions for using the telephone calling card, such as "Dial XXX XXX XXXX," corresponding to the number of the respective card issuer. An instruction to listen to any voice instructions on the phone is printed below the dialing instruction. Naturally, the voice instructions tell a user how to use the telephone calling card. Such instructions could include also written instructions, such as instructions of how to enter the PIN number followed by the number the user is calling. Also, because a PIN number is secret, the instructions can include the directions for scratching off the covering contained over the PIN number.

FIG. 11 illustrates a scratch-off label 37 as disclosed in the '757 patent that has been applied to the phone card. The scratch-off label 37 is formed from a lower label film, i.e., base label layer 44, such as formed from polyester or some other thin film material. This lower label film 44 forms the base part of the illustrated scratch-off label 37. A plurality of these lower label films 44 forming the labels 37 can be positioned on a carrier web 46 (FIG. 8A) as known to those skilled in the art. The carrier web 46 having the applied labels is typically wound on a supply roll as known to those skilled in the art. The lower side of the lower label film 44 engages the carrier web and includes a self-adhesive that adheres the label 37 to the carrier web.

Figure 8A:
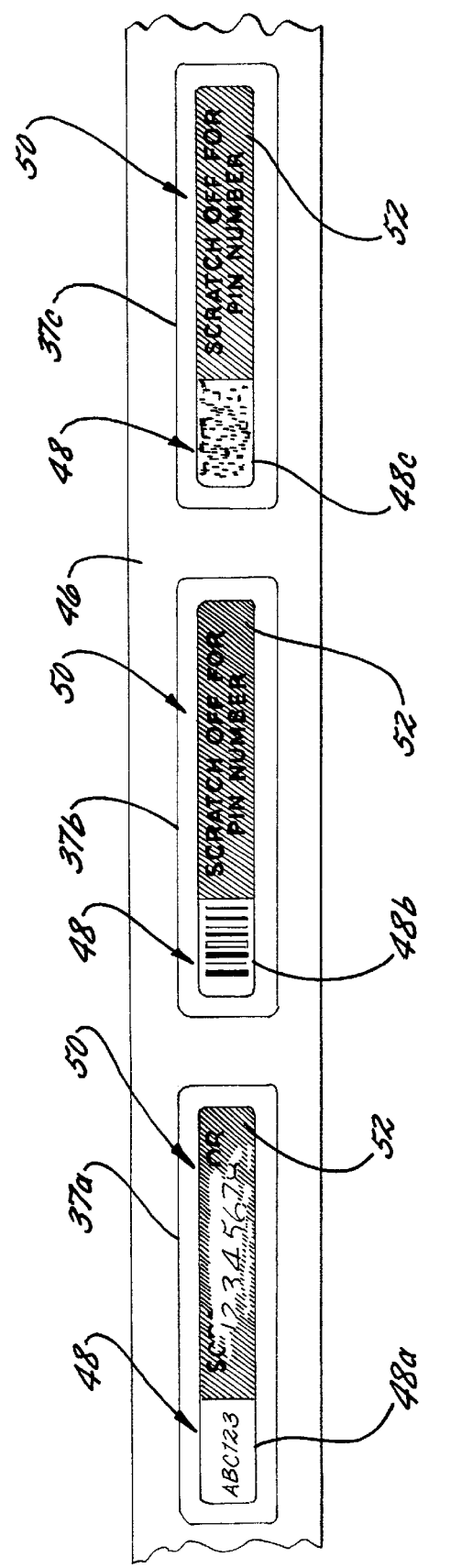
FIG. 8A is an example of a carrier web showing scratch-off labels applied in spaced orientation.

A control code field 48 is positioned on one side of the lower label film 44, together with an associated PIN code field 50. The PIN code field 50 has a PIN, i.e., PIN code, printed thereon and is covered with a scratch-off layer formed as a paint or other similar coating 52 (FIG. 8A) that can be scratched-off by the purchaser of the telephone calling card. The PIN code typically is four to eight digits or could include an alphanumeric code. FIG. 8A illustrates three scratch-off labels carried on a web. The first scratch-off label 37a has a portion of the coating, i.e., scratch-off layer 52, scratched off to display a numeric PIN code.

The control code field 48 is not covered with a scratch-off layer and is left exposed on the base label layer. This field 48 could include an alphanumeric code 48a, a bar code 48b or a two-dimensional bar code 48c, as illustrated in FIG. 8A. It is also possible to use a series of snow flakes or dots formed as a grid or matrix that can be decoded in bit form. The bar code can be a two-dimensional bar code with a dot matrix configuration. It is also possible to use a hologram. As is known, the control code could be scanned optically by other means to allow encoding via a data encoded strip, such as a magnetic strip 54, of dollar amounts. Other information could be contained on the magnetic strip as is well known to those skilled in the art. It is also possible to apply the data encoded strip as a label stripe during processing before, simultaneously or after the application of the scratch-off label 37. Although the illustrated embodiment shows a control code printed on the scratch-off label base layer 44, it is not necessary that the control code field be positioned on the scratch-off label 37.

FIGS. 12A–12H illustrate the enhanced security features of the telephone calling card and debit card of the present invention. For purposes of description, common elements between the label of the present invention shown in FIGS. 12A–12H and the label shown in FIGS. 8–11 have the same reference numerals.

It should be understood that the enhanced security features are provided by a scratch-off label 37' that includes a base label 37a having an opaque, releasable film layer 37b positioned thereon. A PIN is printed on the opaque, releasable film layer at the pin number field 50. A scratch-off cover label 37c is secured on the base label 37a. The scratch-off layer 52 covers the PIN to obscure from viewing the PIN.

Figure 12A:
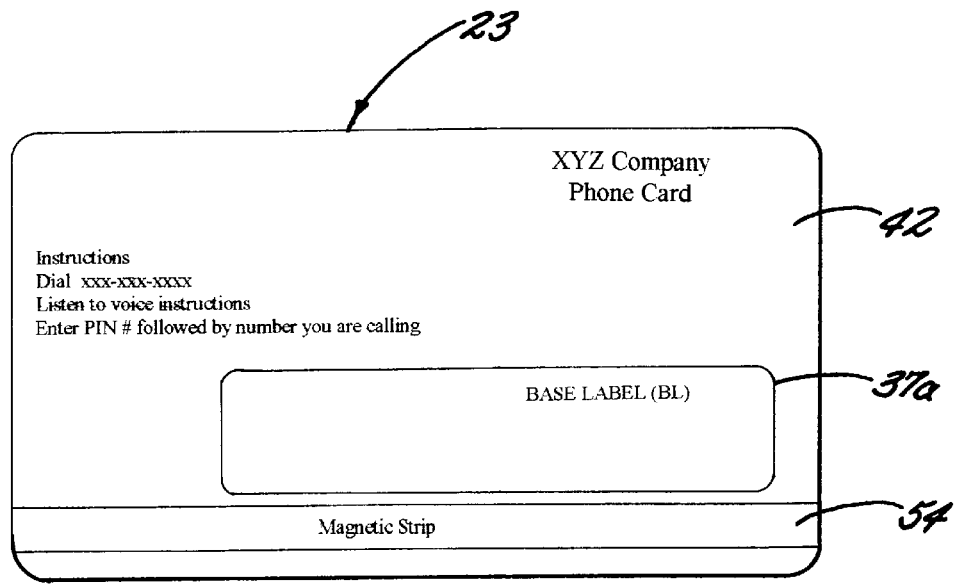
FIGS. 12A–12F show the steps of applying a secure scratch-off label of the present invention to a telephone calling card or debit card where a base label is first applied (FIG. 12A), followed by application of an opaque, releasable film layer and PIN (FIG. 12B), a scratch-off cover label (FIG. 12C), the scratch-off layer (FIG. 12D), a hologram (FIG. 12E), and printed indicia such as "SCRATCH HERE" on the scratch-off layer (FIG. 12F).

Upon application of a peeling force to remove the scratch-off cover label 37c, such as by lifting the scratch-off cover label 37c shown in FIG. 12H, the opaque, releasable film layer 37b is removed and hides the printed PIN from viewing via its backside because the film layer 37b is opaque. This scratch-off label 37' with the enhanced security features of the present invention can be processed on the card 23 as shown in FIGS. 12A–12F, or separately processed as a single label unit 37' and attached on a carrier web as illustrated in FIG. 12G. FIGS. 12A–12F are illustrative of one manner of manufacturing the label 37' whether on the card directly or as a separate label unit to be positioned on a separate carrier web. FIG. 12H is a sectional view of the label 37' of the present invention and illustrating the various components of this scratch-off label with enhanced security features of the present invention.

As shown in FIG. 12A, the base label 37a can be applied first onto the planar card member forming the debit card, e.g., telephone calling card. In one aspect of the present invention, the base label 37a can be formed of clear styrene. This is not necessary, however, and the label conceivably could be any color. The base label 37a could also be formed as polyester or paper and any other materials known to those skilled in the art. The base label can be secured by an adhesive 37d that is retained on the underside of the base label or an adhesive that is applied directly onto the card. This adhesive 37d can be a pressure sensitive adhesive as known to those skilled in the art.

Figure 12B:
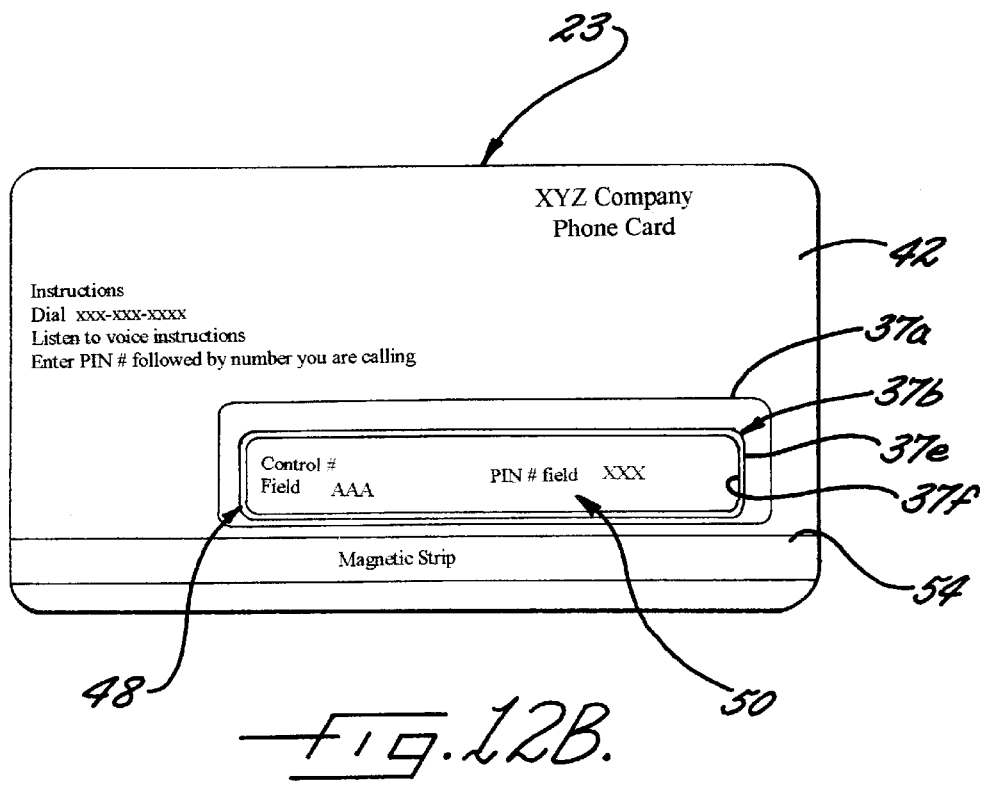
Figure 12C:
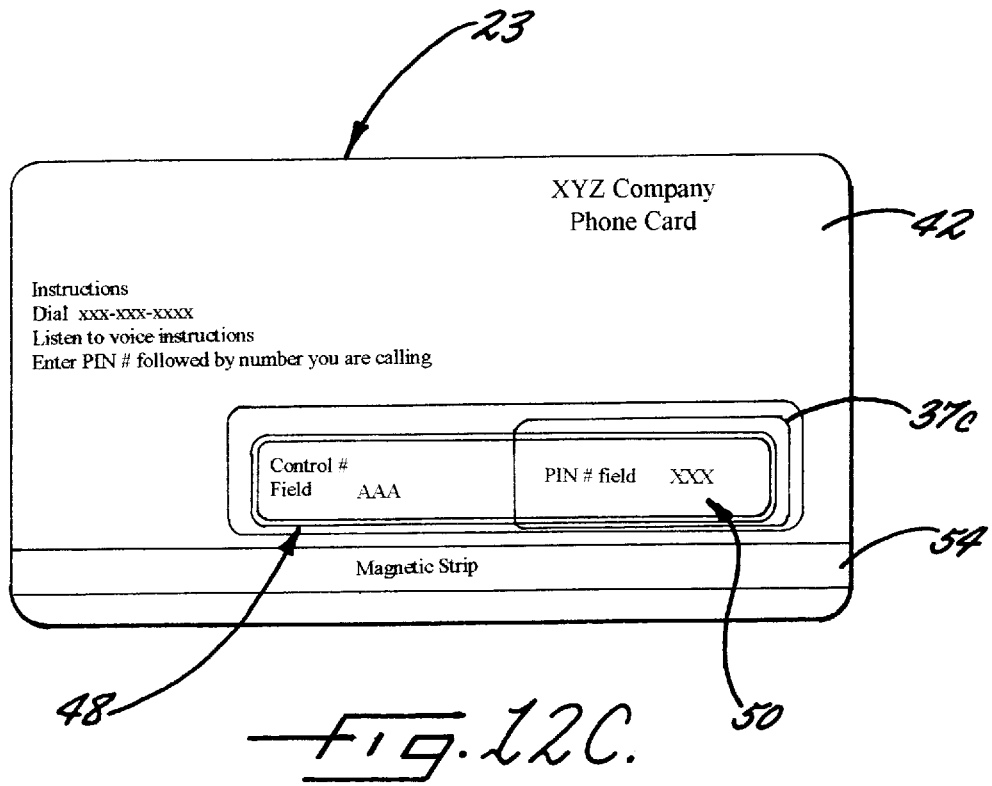

As shown in FIG. 12B, the releasable film layer 37b is positioned on the base label. This releasable film layer, in one aspect of the present invention, is formed by a releasable plastic film 37e and an opaque white ink 37f that is printed on the plastic film, as shown in FIGS. 12B and 12H. It is possible that the releasable film layer 37b could also be formed not only from a plastic film 37e and ink 37f, but also could be formed as an ink layer that is opaque and releasable, or a first releasable ink layer followed by an additional opaque ink layer or series of ink layers.

Figure 12D:
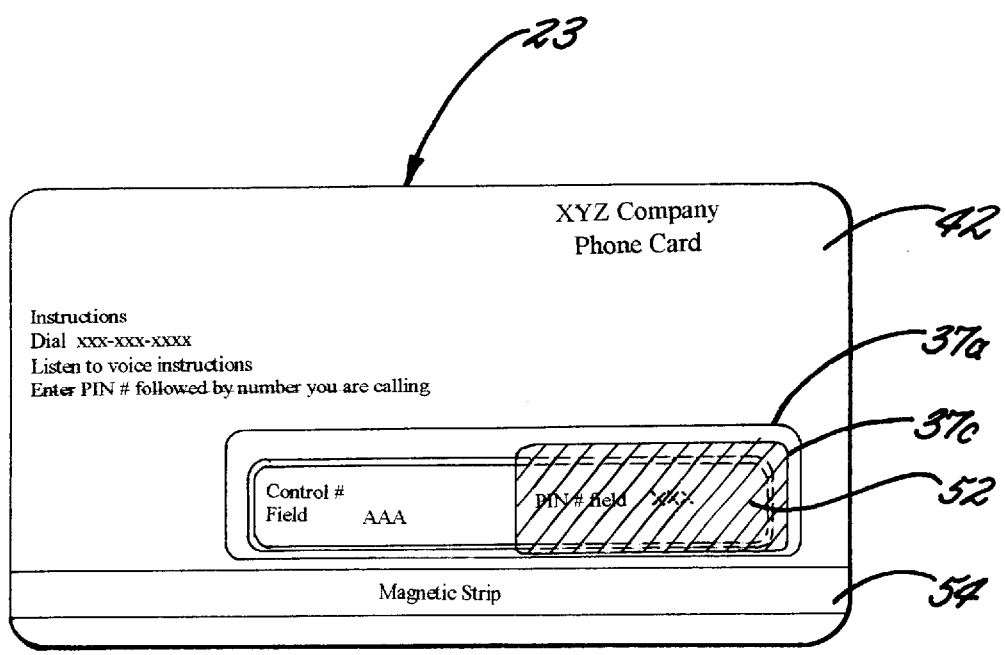
Figure 12E:
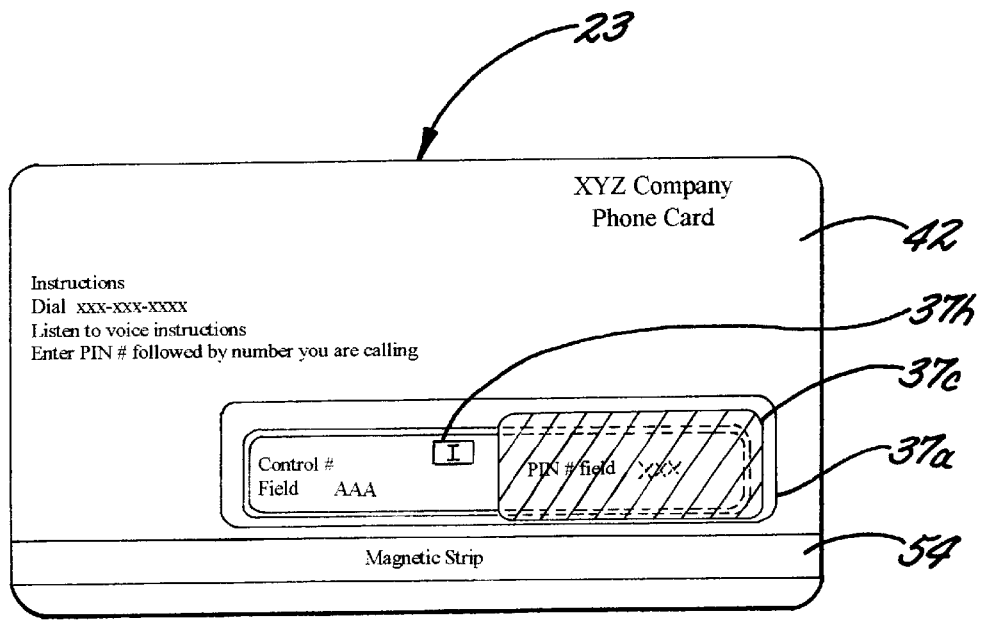

As shown in FIG. 12B, the PIN code, illustrated as "XXX", is printed, such as by ink jet printing, onto the opaque white ink 37f forming part of the releasable film layer 37b. Also, a control number, such as the illustrated "AAA" is printed such as by ink jet printing into the control number field 48. A scratch-off cover label 37c is secured onto the base label 37a and is preferably formed from a clear styrene film or other clear film material 37i. This scratch-off cover label 37a includes an adhesive 37g (FIG. 12H), such as a pressure sensitive adhesive, that adheres the film 37i of the scratch-off cover label 37 directly onto the base label 37a. It is seen that the scratch-off cover label 37c covers only the PIN number field 50 and not the control number field 48. A scratch-off layer 52, such as a scratch-off paint or other mechanism, is printed on top of the scratch-off cover label 37c, as shown in FIG. 12D. An authenticator 37h is also added to the scratch-off label 37' of the present invention and is shown as the illustrated "I" on the base label 37a. The authenticator could be a hologram, diffraction grating, or other identifier as described before. It should be understood that, in addition to the hologram, the secure aspect of the scratch-off cover label can include the hologram and other techniques used alone or together, including a diffraction grating, kinigram, dot matrix, selective demetallization and other secure printing techniques known to those in the industry and skilled in the art.

Figure 12F:
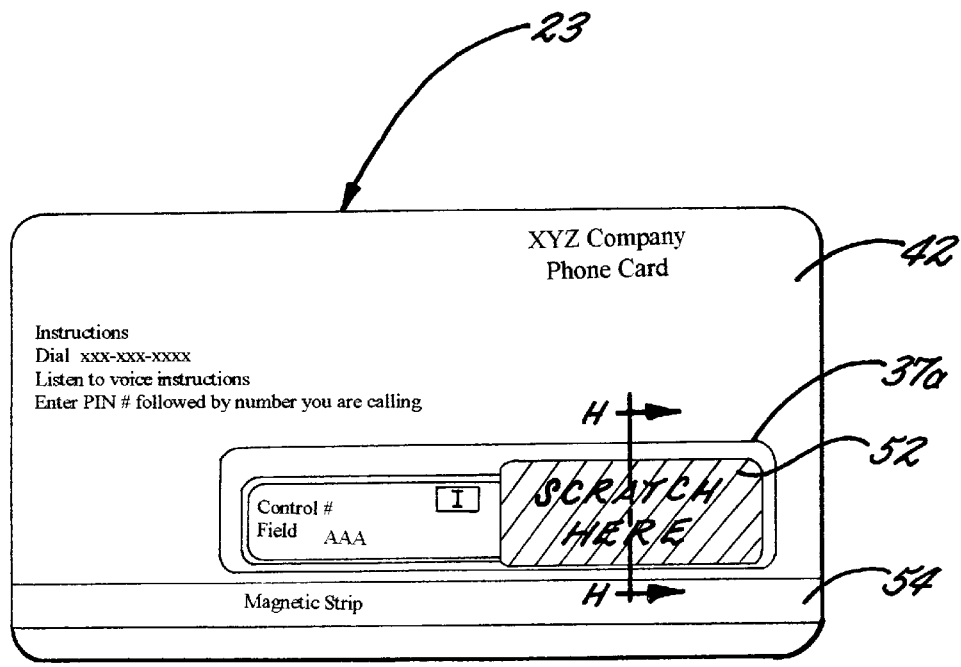
Figure 12G:
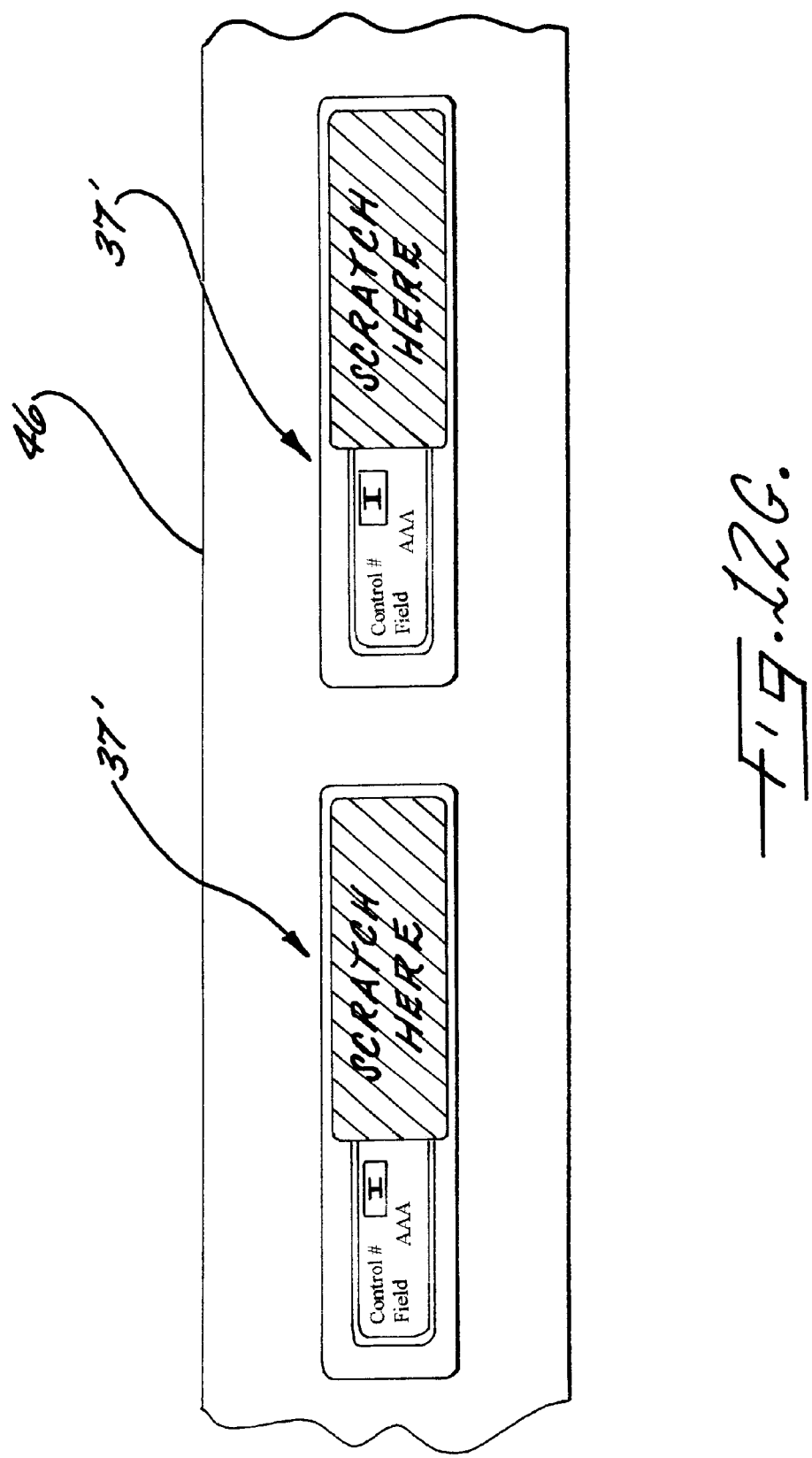
FIG. 12G shows a web of carrier material having scratch-off labels of the present invention that can be removed and applied onto a telephone calling card or debit card as a single step.

As shown in FIG. 12F, text can be added onto the scratch-off layer, such as the instructions "SCRATCH HERE", which indicates that the scratch-off layer 52 should be removed to identify the PIN. FIG. 12H shows details of the label 37' in a sectional view taken along line H—H of FIG. 12F, and shows how the releasable film layer is removed with the scratch-off cover label. Printed indicia is shown by fragmentary lines 37j, corresponding to the printed PIN or directions, such as "SCRATCH HERE." Because there is an opaque ink 37f on the film 37e forming the releasable film layer 37b to form an opaque covering, the PIN cannot be identified when viewing through the reverse side of the cover label 37a.

FIG. 12G illustrates an aspect of the present invention where the scratch-off label 37' of the present invention has been formed as an integral label unit and carried on a carrier web 46 as a single, scratch-off label unit. A plurality of scratch-off labels 37' are carried on the carrier web 46 in roll form and removed during automated processing and applied onto respective telephone calling cards or debit cards. This type of processing can be advantageous for high speed application of the scratch-off label under many different cards. The scratch-off label 37' is removed as one integral scratch-off label unit, having the various components of the base label 37a and scratch-off cover label 37c, and applied onto a debit card or telephone calling card. Naturally, as described before, the individual components of the scratch-off label strip could be applied one at a time onto the card as described before. The scratch-off cover label could also be applied with a scratch-off layer 52 already applied onto the scratch-off cover label 37c. It is also possible to cover the control number field 50 with the scratch-off cover label if the scratch-off layer is applied over the PIN.

The present invention as described provides for enhanced security. The scratch-off label can be removed, such as by freezing, but the PIN code will not be compromised because it cannot be seen through the opaque release layer, such as the different inks.

Figure 12I:
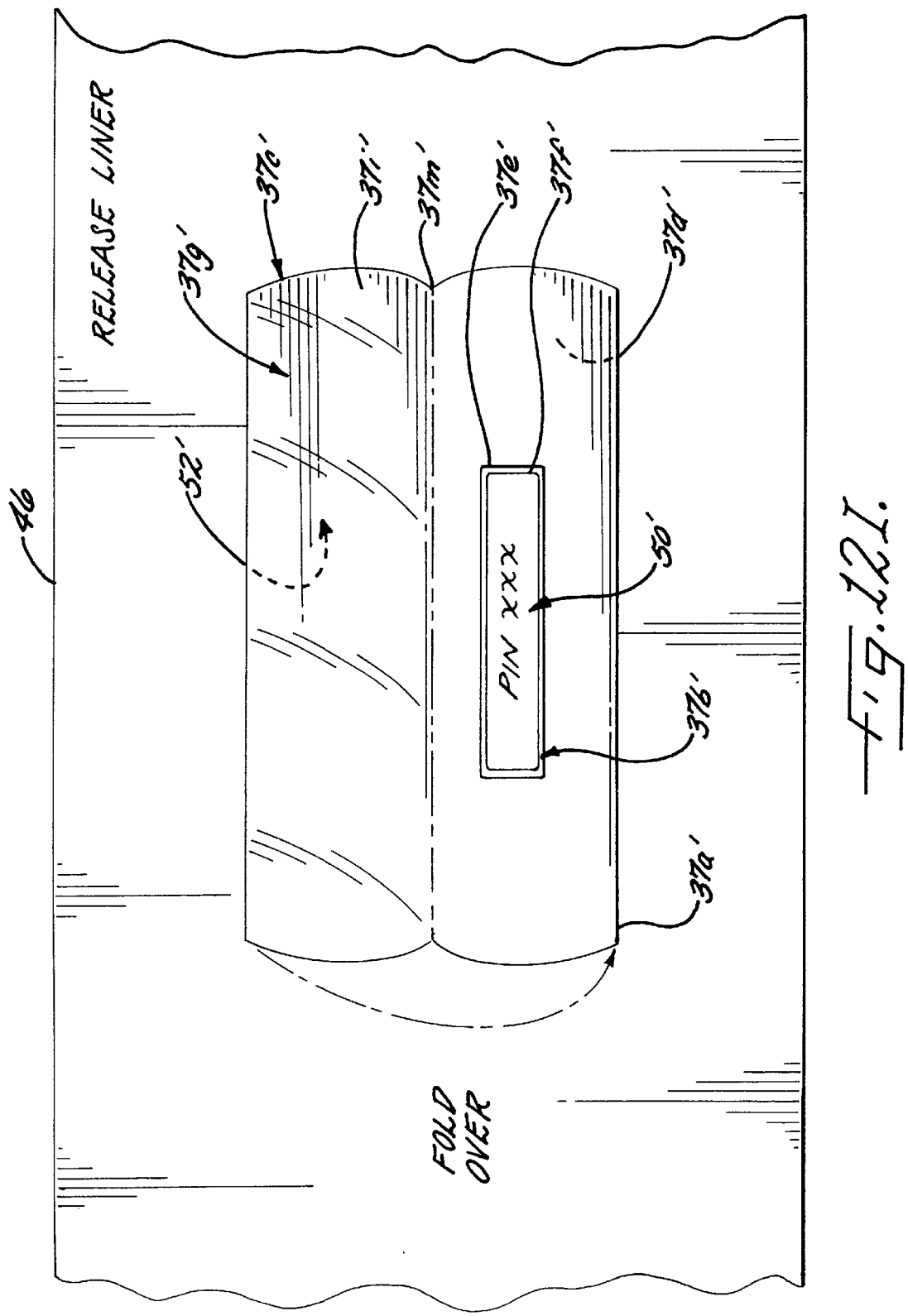
FIG. 12I illustrates another embodiment of the secure scratch-off label of the present invention formed as a one-piece member and having a base label and scratch-off cover label folded over the base label after the PIN has been printed.

FIG. 12I illustrates a second embodiment of the secure scratch-off label of the present invention where the scratch-off cover label is formed as a one-piece member. The base label is folded over onto the base label after the PIN has been printed.

For purposes of description, prime notation is used for similar structural elements as in the previous embodiment shown in FIGS. 12A through 12H. In this particular embodiment, the scratch-off label is formed on a release liner 46 as described before. The base label 37a' has a releasable film layer 37b' formed from a releasable plastic film 37e' having an opaque white ink 37f' as described before. The PIN number XXX is printed on the opaque white ink. An adhesive 37d' is positioned on the underside of the base label. At the same time, the scratch-off cover label 37c' includes an adhesive 37g' on the top and scratch-off covering 52' on the underside, as illustrated. The label could be formed separate and then applied onto the release liner 46. The PIN number is printed and then the scratch-off cover label 37c' is folded over the base label 37a' along hinge line 37m' to cover the PIN number. As before, if the label is tampered, the release layer 37b' releases from the base label 37a' and the PIN is not compromised. As described before, the release layer 37b' is formed to be opaque, such as by the opaque white ink or other means as described before. Any adhesives can be pressure sensitive adhesives.

An article feeder 22 can be used not only for feeding thick and rigid articles, such as credit cards and phone cards, but can also be used for feeding many different types of mail, including small envelopes and large envelopes of varying thickness together with intermixed mail that is tabbed. The following description is only one type of card processing mechanism that can be used with the present invention. Other types of card processing apparatus and methods can be used as known to those skilled in the art. The article feeder 22 can feed up to 50,000 pieces per hour and has a unique feed system, e.g., singulator, to allow most intermixed mail to feed without adjustments from a large stack, such as shown in FIG. 2, where exemplary phone cards are stacked in a stand-up, i.e., vertical configuration. Although FIG. 2 shows a large plurality of about three feet of phone cards stacked in the feeder bin 24, any type of mail can be intermixed and fed single into the feed discharge belt assembly 28.

Figure 3:
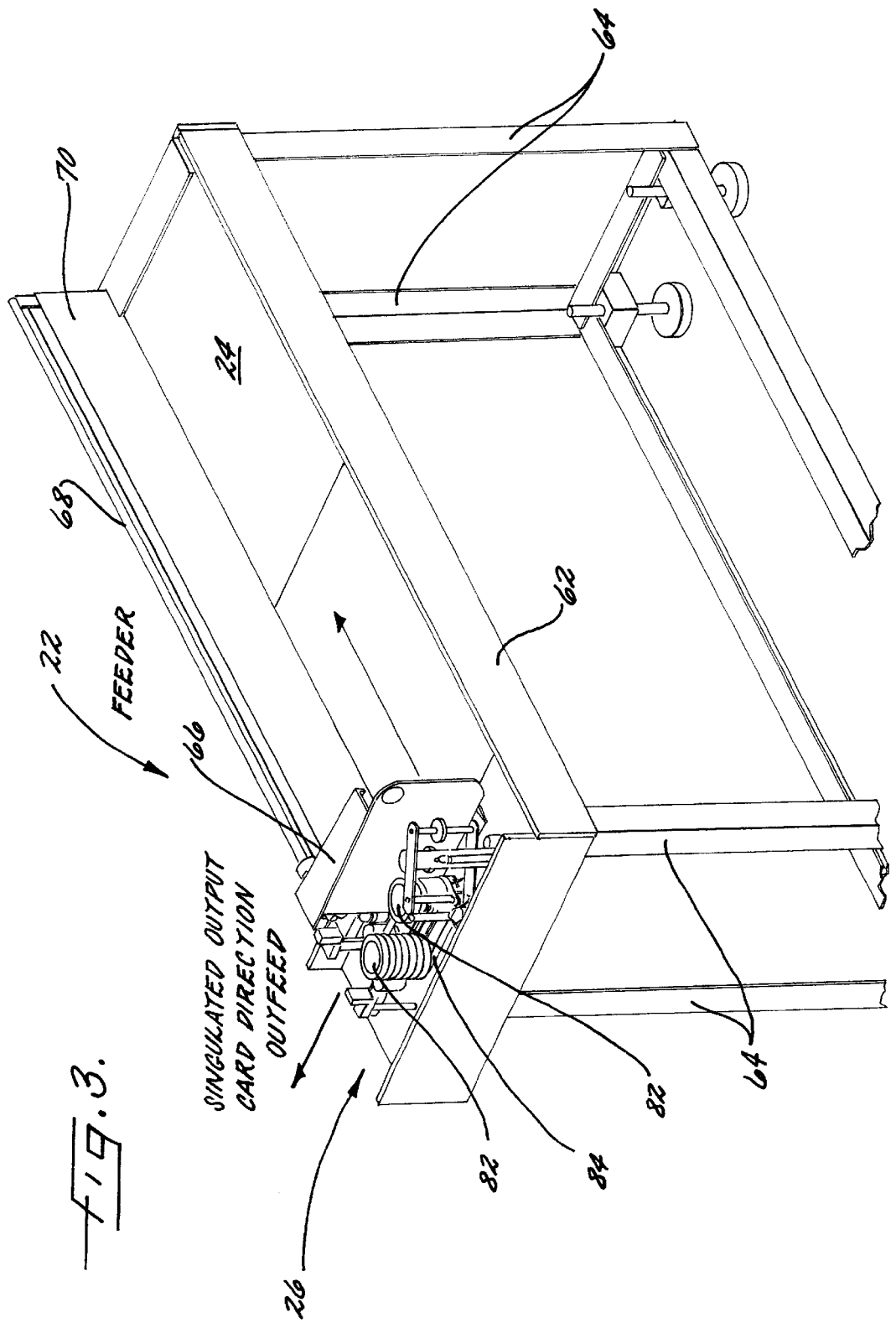
FIG. 3 is a schematic, isometric view of the article feeder and showing details of the article stripper mechanism.
Figure 4:
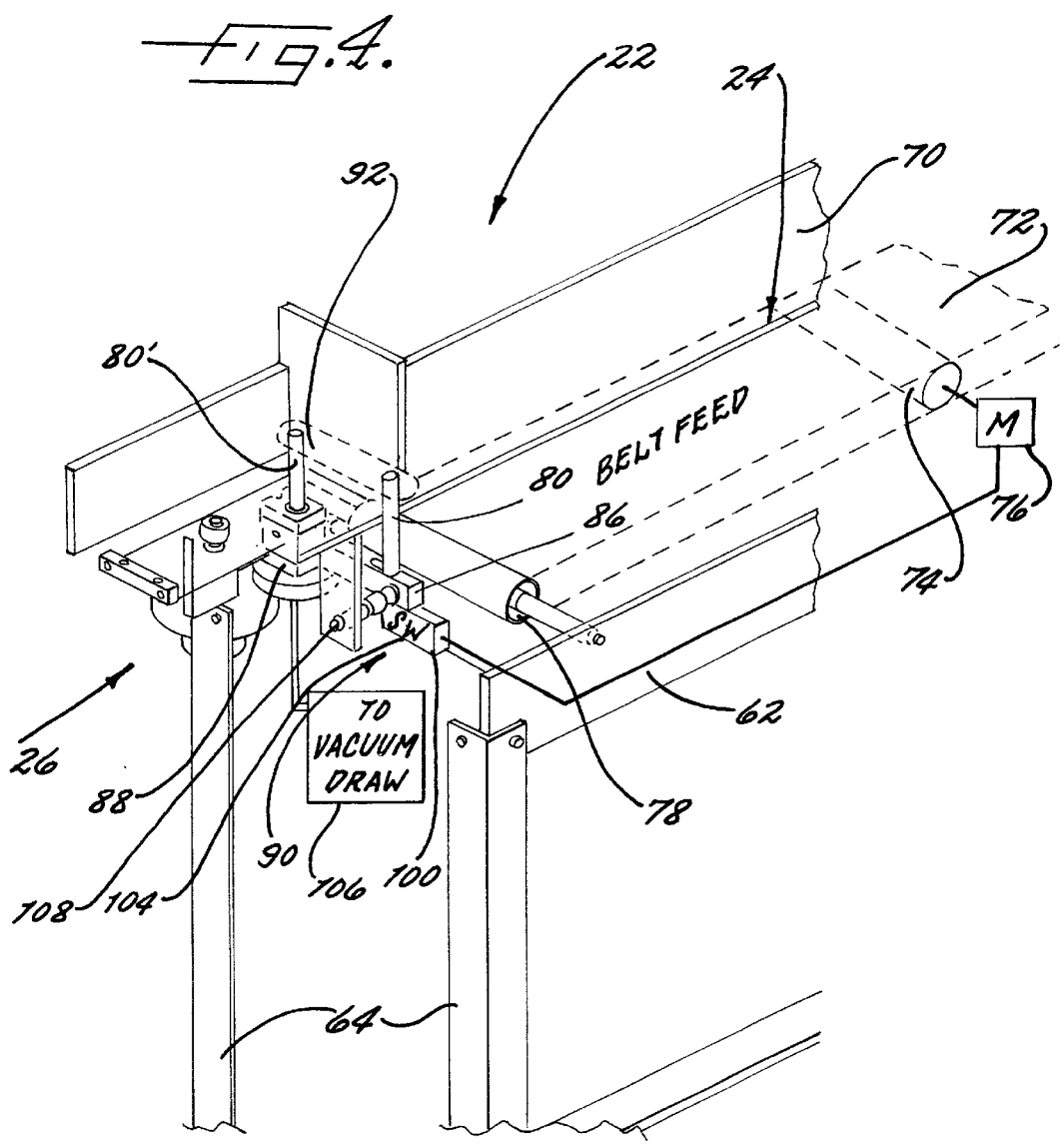
FIG. 4 is a partial isometric view of the article feeder of FIG. 3, showing greater details of the stripper mechanism, including the belt feed, vacuum draw and microswitch for controlling the belt feed motor.

As shown in greater detail in FIGS. 3 and 4, the feeder bin 24 is positioned on a support table 62 having support legs 64, which give a feed height that is the same as the other components and tables of the automated card processing system, as shown in FIG. 1. An article retaining plate 66 is slidably moveable on a guide rod 68 and positioned adjacent a side support 70. Cards, such as the illustrated phone card, or other articles, such as pieces of mail and envelopes, are stacked against the side support 70. The retaining plate 66 is moved forward with spring biasing against the articles as shown in FIG. 2. As better shown in FIG. 4, the stack of articles positioned in the feeder bin 24 rest on a conveyor belt 72 that is positioned over a first belt pulley 74, which is driven by a motor 76 that actuates and drives a second belt pulley 78.

Figure 5:
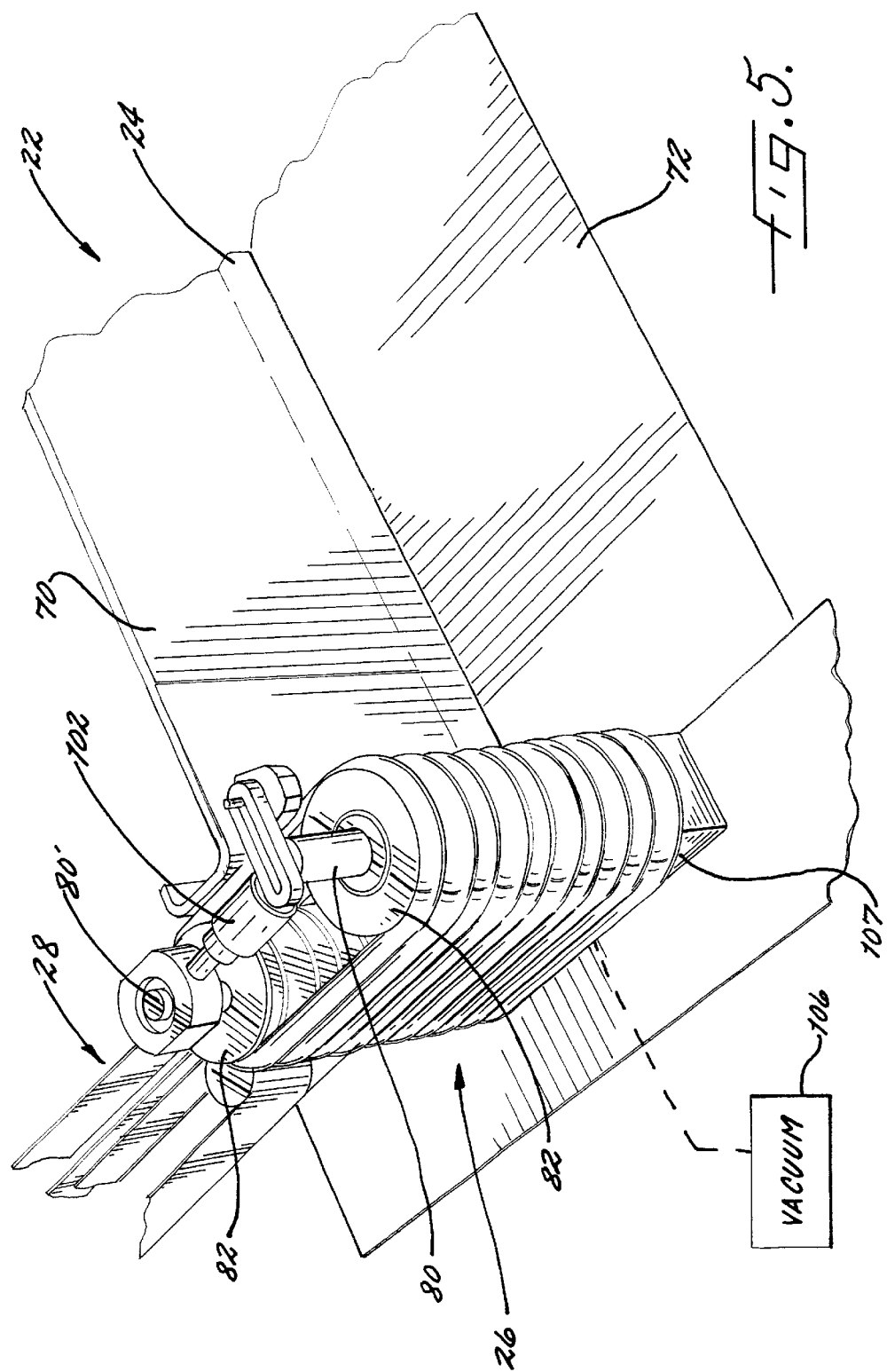
FIG. 5 is an enlarged isometric view of the stripper belts shown in FIG. 3.

FIG. 5 is an enlarged isometric view of the stripper belt mechanism 26 for the article feeder 22. The stripper belt mechanism 26 includes two stripper support shafts 80 (FIGS. 3 and 4) that support stripper rolls 82 having a plurality of stripper belts 84 positioned on the stripper rolls 82. As shown in FIG. 4, the first and second stripper support shafts 80 are positioned such that the stripper rolls 82 and associated stripper belts 84 provide a flat surface against which the cards or other articles engage the belts as shown in FIG. 2.

The stripper support shafts 80 are supported on a horizontally moveable shaft support member 86 that is moveable in a direction to and from the article conveyor belt 72. A drive motor 88 engages one of the stripper support shafts, i.e., the first shaft, to rotate the associated stripper rolls and stripper belts. In FIG. 4, the first stripper support shaft 80' is powered for rotation. An adjustable biasing member 90 is engaged against the shaft support member 86 and applies a biasing force against the shaft support member 86 to allow a back pressure to be exerted against articles stacked in the feeder bin 24.

Figure 6:
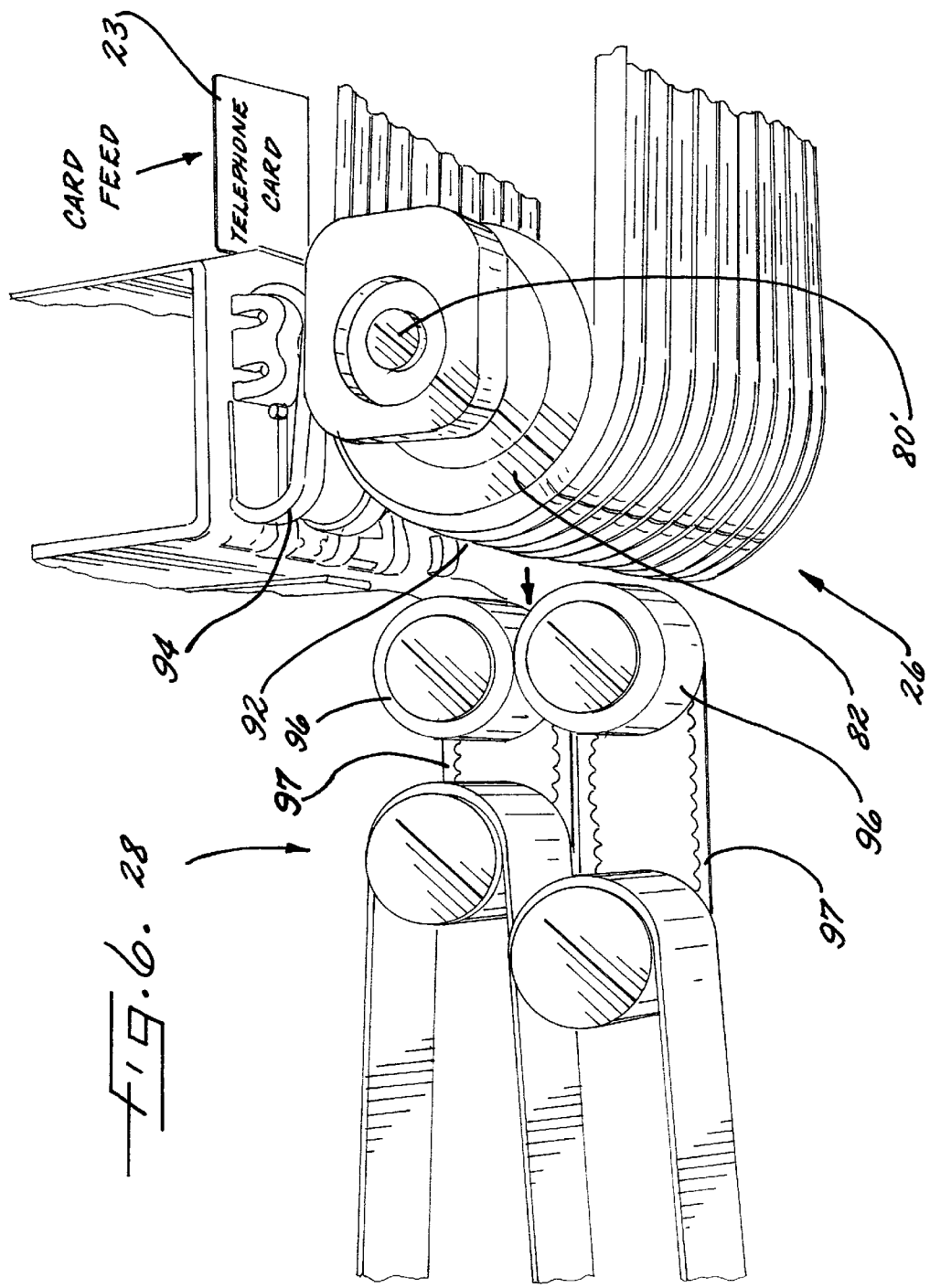
FIG. 6 is another isometric view of the stripper belts and showing the stripper fingers and feed discharge belt assembly.

Friction between the article, such as the illustrated telephone calling card, and the stripper belts 84, allows an article, e.g., telephone calling card, to be "stripped" or drawn away from the stack in singulated fashion, one-by-one, into the feed discharge belt assembly 28. As shown in FIG. 6, each article is pulled away from the article stack through a pre-shingler 92, such as formed from Teflon, and through a series of stripper fingers 94, which guide the article through two discharge pinch rolls 96, which then feed the article into the discharge belts of the feed discharge belt assembly 28. The feed discharge belt assembly 28 and pinch rolls 96 can be driven from common belt transmission 97. At the same time, the stack of articles is pushed by the conveyor belt 72 and retaining plate 66 against the stripper belts 84 to create friction. The conveyor belt movement is controlled in off/on fashion by a microswitch 100, as shown in FIG. 4 as a schematic, rectangular block. A pressure coupling mechanism 102 is mounted on top of the support shafts and the microswitch 100 could be operative with the coupling mechanism (FIG. 5). Different types of microswitches can be used as known to those skilled in the art.

In one aspect of the present invention, the biasing member 90 is formed as spring 104, and biases the shaft support member 86 forward, which in turn, biases the stripper belts 84 against the stack of articles. As the spring biases the shaft support member 86 forward, it actuates the microswitch 100, which turns the conveyor belt motor 76 on and advances the conveyor forward to force cards or articles against the stripper belts. This action forces the stripper belts and shaft support member 86 back, actuating the microswitch to turn the motor off. This releases the back pressure against the article. However, as noted before, with this system only, thinner articles, such as very thin envelopes, sometimes have excessive pressure exerted against them, and as a result, "bunches" of envelopes or other thin articles could be grabbed under friction and forced through the discharge area.

Vacuum can be applied from a vacuum source 106 onto the area associated with the front part of the stripper belts, such as through a vacuum plate 107, having vacuum orifices contained in the plate, or through orifices in the shafts or other means, to draw the first article in the stack against the stripper belts 84 (FIG. 5). Also, the spring 104 can be adjustable, such as by an adjustable screw 108, as illustrated, to increase or decrease the amount of tension, and thus, the exerted back pressure. Thus, it is possible to decrease the amount of tension (back pressure) that could be applied by the stripper belts onto the article stack such that primarily the vacuum provided by the vacuum source 106 would retain an article, such as a thin envelope, against the stripper belts. With this low pressure used for retaining an article, such as when thin articles are fed, only one thin article would be fed or "stripped" into the feed discharge belt assembly 28.

The smaller biasing force of the retaining plate 66 can also be used to push the articles with sufficient pressure against the belts, which together with the vacuum draw of the article, allows article feeding in a singulated fashion even when thin articles and envelopes are used or other articles of mail. If thicker articles, such as a telephone calling card or credit card, are stacked in the feeder bin, then greater back pressure can be exerted by adjusting the spring pressure to allow greater back pressure and allow "stripping" of the cards from the stack.

The article passes into the feed discharge belt assembly 28 and into a transport register table 30. Up to this point in time, the articles have been processed in vertical orientation, i.e., "standing up." At this time, the article is laid flat by the twisted belt feed section 32, which rotates the article 90° to lay the article flat for further processing, such as tabbing, or as in the present invention description, to allow card processing identification, such as encoding, and labeling, where the scratch-off label 37 can be applied as an integral unit, or as component parts serially, as in application of the opaque label strip, followed by code printing, the second label strip and/or the scratch-off layer. An example of a type of twisted belt feed section that could be used is disclosed in U.S. Pat. No. 5,393,366 and assigned to the present assignee of the present invention, Profold, Inc., the disclosure which is hereby incorporated by reference in its entirety.

The telephone calling card is transported along the transport register table, which also could include an associated or separate air transport table 112, which is designed for high-speed, i.e., 50,000 pieces per hour. Air suction is low vacuum and has high air volume for strong article adherence to the belt surface, such as 700 cubic feet of air suction per minute. The air transport could be formed with two belts for more controlled applications of larger articles besides cards, such as envelopes, and also provide control over other processes, such as with ink jet printing. A solid strip can separate the two parallel belts. The air transport table can be adjusted in height and has a modular design to be used in line with feeders, tabbers, labelers, affixers, and other equipment.

Figure 7:
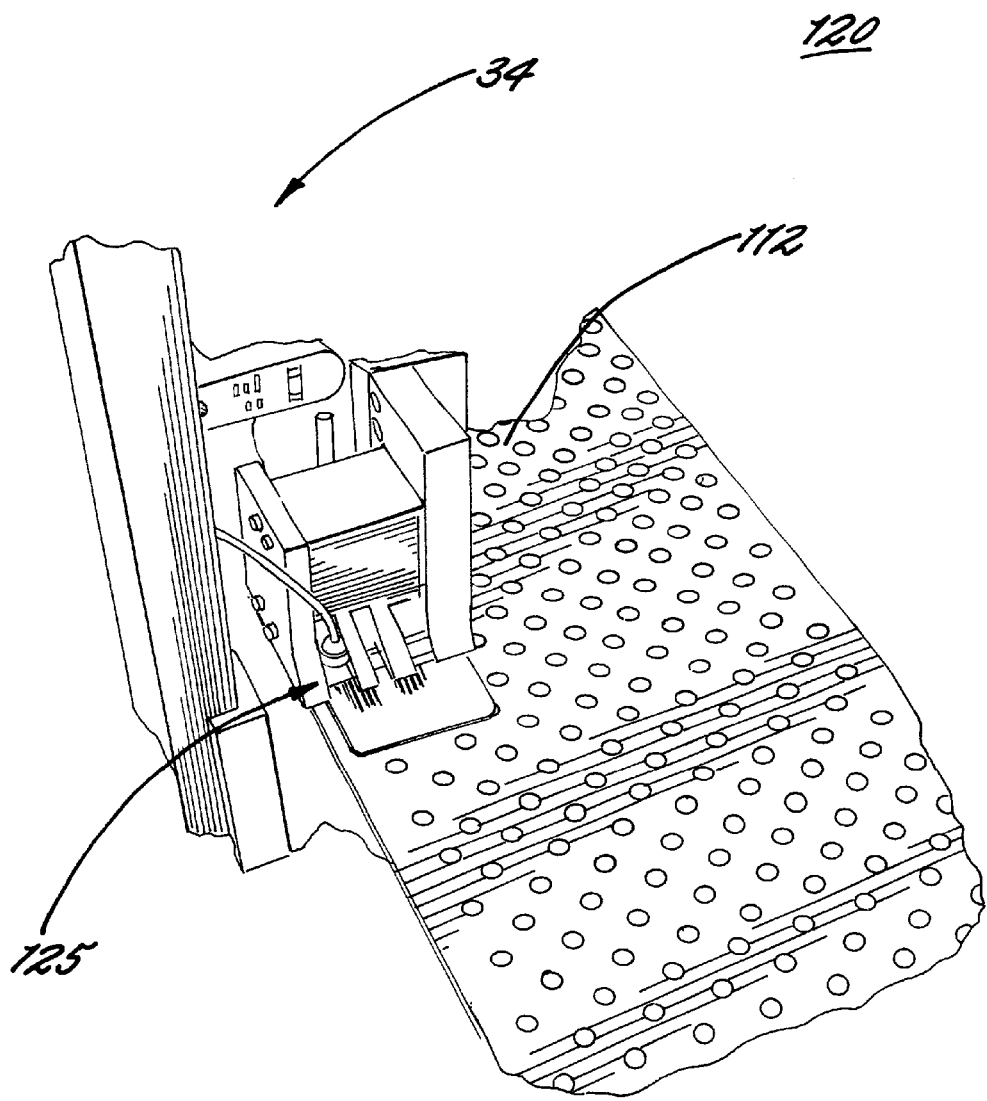
FIG. 7 is a partial isometric view of a labeler that can be used for applying the scratch-off label of the present invention.

FIGS. 7 and 8 show a labeling station 120 where a scratch-off labeler 34 has a supply reel 122, having a roll formed of a carrier web of labels in which a series of idler and drive rolls 124 form a serpentine, controlled delivery path for the carrier web where the label is stripped by a label stripping mechanism 125 from the carrier web, in timed unison, with the telephone calling card as the telephone calling card advances into the label applying station 120. The label 37 adheres to the telephone calling card. The carrier web is taken up in a take-up reel 126.

One of the benefits of the label 37' of the present invention over prior art telephone calling cards using a printed PIN and control code is the accuracy required when any scratch-off layer using paint or other coating was applied. The application of any coating had to be accurately aligned with the printed PIN number while leaving unexposed the control code. It also could not interfere with the control code field. A label having a preprinted control code field and PIN code in the PIN code field can be applied onto the telephone calling card at very high speeds, up to 50,000 pieces an hour, with some inaccuracy as long as the label does not cover necessary portions, such as any magnetic strip. The phone card would be operable.

Once the telephone calling cards have been labeled, they are then transported into an article stand-up feed section 130, where a 90° feed belt section turns the cards in vertical, i.e., "standing up", orientation. The telephone calling cards are then fed into a sorting station 200, such as that shown in FIG. 9, where a plurality of article bins receive articles from respective feed belt assemblies as explained below.

Referring now to FIG. 9, there is illustrated the sorting station 200, which includes a tray sorter 36 that sorts articles, such as the illustrated telephone calling card or other articles and mail pieces, by feeding individual articles in vertical orientation along a predetermined path of travel into a respective article bin 212. The articles could include mixed pieces that have different sizes, including different lengths and widths of mail and different thicknesses. In the illustrated example, the articles are the same-size telephone calling cards 27.

As evident, the sorting station 200 has four article bins 212 that receive articles from four respective feed belt assemblies 214. Although four article bins 212 and four feed belt assemblies 214 are illustrated, naturally, the sorting station 200 can include one, two or any number of different article bins having respective feed belt assemblies as necessary for the processing of articles.

Each article bin 212 includes two parallel side walls 212a and a biased end wall 212b, forming a rectangular configuration. The end wall 212b is slidable on a support rod 212c via a support flange 212d that extends across the top portion of the end wall 12b. A bottom surface 212e holds the article. Sheet steel, plastic or other materials known to those skilled in the art can be used to construct the article bin.

The articles are fed by the feed belt assembly 214 in a vertical orientation, and not horizontal. The articles enter the feed belt assembly 214 having at least one large longitudinally extending feed belt 218 that is driven by a drive roller 220 connected to a drive motor (not shown) at the belt end defined by the endless loop. The belt 218 engages stationary tension rolls 222 that maintain pressure on the feed belt 218. The feed belt 218 is a flat belt. Positioned adjacent the feed belt is another flat drive belt 224. The article is passed between the endless loop feed belt 218 and the endless loop flat drive belt 224.

As illustrated, in accordance with the present invention, the feed belt assembly 214 includes a discharge end positioned adjacent the article bin 212, for discharging articles into the bin 212. The feed belt assembly 214 at its discharge end 226 can include first and second brush rolls 230, 232 positioned at the discharge end of the feed belt assembly. When articles are thin mail pieces, the brush rolls can be used to impart a concave profile to the mail piece to aid in reducing any damage to a side edge of each individual mail piece. When the articles are smaller dimensioned phone cards, the brush rollers do not have to be used.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A telephone calling card comprising:
   a planar card member;
   a scratch-off label positioned on a surface of the planar card member, said scratch-off label comprising:
   a base label having an opaque, releasable film layer positioned thereon and a PIN (Personal Identification Number) printed on the opaque, releasable film layer; and
   a scratch-off cover label secured on the base label and having a scratch-off layer that covers the PIN to obscure from viewing the PIN, wherein upon application of a peeling force to remove the scratch-off cover label, the opaque, releasable film layer is removed and hides the printed PIN from viewing via the backside of the opaque, releasable film layer.

2. A telephone calling card according to claim 1, wherein said base label includes an adhesive for retaining the base label onto the planar card member.

3. A telephone calling card according to claim 2, wherein said adhesive comprises a pressure sensitive adhesive.

4. A telephone calling card according to claim 1, wherein said scratch-off cover label is folded over said base label.

5. A telephone calling card according to claim 1, wherein said base label comprises a styrene film.

6. A telephone calling card according to claim 1, wherein base label comprises a paper label.

7. A telephone calling card according to claim 1, wherein said releasable film layer comprises a plastic film positioned on the base label.

8. A telephone calling card according to claim 7, wherein said plastic film includes an opaque ink printed thereon, said PIN printed on said opaque ink.

9. A telephone calling card according to claim 1, wherein said releasable film layer comprises an opaque ink layer.

10. A telephone calling card according to claim 1, wherein said scratch-off cover label comprises a substantially clear plastic film.

11. A telephone calling card according to claim 10, and further comprising an adhesive positioned on one side of said clear plastic film for retaining the scratch-off cover label onto the base label and a scratch-off layer on the opposing side.

12. A telephone calling card according to claim 1, and further comprising a control code field positioned adjacent the PIN, wherein the scratch-off layer covers only the PIN.

13. A telephone calling card according to claim 1, and further comprising an authenticator positioned on the scratch-off cover label.

14. A telephone calling card according to claim 13, wherein said authenticator comprises a hologram.

15. A telephone calling card according to claim 1, wherein said planar card members are rectangular configured and wallet-sized.

16. A debit card comprising:
    a planar card member having front and rear surfaces;
    a data encoded strip positioned on the rear surface of the planar card member;
    a scratch-off label strip positioned on the rear surface of the planar card member, said scratch-off label strip comprising:
    a base label having an opaque, releasable film layer positioned thereon and a PIN (Personal Identification Number) printed on the opaque, releasable film layer; and
    a scratch-off cover label secured on the base label and having a scratch-off layer that covers the PIN to obscure from viewing the PIN, wherein upon application of a peeling force to remove the scratch-off cover label, the opaque, releasable film layer is removed and hides the printed PIN from viewing via the backside of the opaque, releasable film layer.

17. A debit card according to claim 16, wherein said base label includes an adhesive for retaining the base label onto the planar card member.

18. A debit card according to claim 17, wherein said adhesive comprises a pressure sensitive adhesive.

19. A debit card according to claim 16, wherein said scratch-off cover label is folded over said base label.

20. A debit card according to claim 16, wherein said base label comprises a styrene film.

21. A debit card according to claim 16, wherein base label comprises a paper label.

22. A debit card according to claim 16, wherein said releasable film layer comprises a plastic film positioned on the base label.

23. A debit card according to claim 22, wherein said plastic film includes an opaque ink printed thereon, said PIN printed on said opaque ink.

24. A debit card according to claim 16, wherein said releasable film layer comprises an opaque ink layer.

25. A debit card according to claim 16, wherein said scratch-off cover label comprises a substantially clear plastic film.

26. A debit card according to claim 25, and further comprising an adhesive positioned on one side of said clear plastic film for retaining the scratch-off cover label onto the base label and a scratch-off layer on the opposing side.

27. A debit card according to claim 16, and further comprising a control code field positioned adjacent the PIN, wherein the scratch-off layer covers only the PIN.

28. A debit card according to claim 16, and further comprising an authenticator positioned on the scratch-off cover label.

29. A debit card according to claim 28, wherein said authenticator comprises a hologram.

30. A debit card according to claim 16, wherein said debit card comprises a telephone calling card.

31. A debit card according to claim 16, wherein said data encoded strip is formed as a magnetic strip.

32. A debit card according to claim 16, wherein said data encoded strip is formed as a label stripe that has been applied in an automated labeling process.

33. A debit card according to claim 16, wherein said planar card members are rectangular configured and wallet-sized.

34. A method of applying a PIN (personal identification number) onto a debit card comprising the steps of:
supplying a batch of planar card members;
feeding the card into a labeling station and at the labeling station, applying a scratch-off label comprising:
a base label having an opaque, releasable film layer positioned thereon and a PIN (Personal Identification Number) printed on the opaque, releasable film layer; and
a scratch-off cover label secured on the base label and having a scratch-off layer that covers the PIN to obscure from viewing the PIN, wherein upon application of a peeling force to remove the scratch-off cover label, the opaque, releasable film layer is removed and hides the printed PIN from viewing via the backside of the opaque, releasable film layer.

35. A method according to claim 34, wherein said planar card members are rectangular configured and wallet-sized.

36. A method according to claim 34, and further comprising the step of forming the scratch-off label as a one-piece member, and folding the scratch-off cover label over the base label.

37. A telephone calling card comprising:
a planar card member;
a one-piece scratch-off label positioned on a surface of the planar card member, said scratch-off label comprising:
a base label having an opaque, releasable film layer positioned thereon and a PIN (Personal Identification Number) printed on the opaque, releasable film layer; and
a scratch-off cover label folded over the base label and secured thereto and having a scratch-off layer that covers the PIN to obscure from viewing the PIN, wherein upon application of a peeling force to remove the scratch-off cover label, the opaque, releasable film layer is removed and hides the printed PIN from viewing via the backside of the opaque, releasable film layer.

38. A telephone calling card according to claim 37, wherein said base label includes an adhesive for retaining the base label onto the planar card member.

39. A telephone calling card according to claim 37, wherein said adhesive comprises a pressure sensitive adhesive.

40. A debit card comprising:
a planar card member having front and rear surfaces;
a data encoded strip positioned on the rear surface of the planar card member;
a one-piece scratch-off label strip positioned on the rear surface of the planar card member, said scratch-off label strip comprising:
a base label having an opaque, releasable film layer positioned thereon and a PIN (Personal Identification Number) printed on the opaque, releasable film layer; and
a scratch-off cover label folded over the base label and secured thereto and having a scratch-off layer that covers the PIN to obscure from viewing the PIN, wherein upon application of a peeling force to remove the scratch-off cover label, the opaque, releasable film layer is removed and hides the printed PIN from viewing via the backside of the opaque, releasable film layer.

41. A debit card according to claim 40, wherein said base label includes an adhesive for retaining the base label onto the planar card member.

42. A debit card according to claim 41, wherein said adhesive comprises a pressure sensitive adhesive.

43. A debit card according to claim 40, wherein said debit card comprises a telephone calling card.

* * * * *

UNITED STATES PATENT AND TRADEMARK OFFICE
CERTIFICATE OF CORRECTION

PATENT NO.      : 6,609,662 B2
DATED           : August 26, 2003
INVENTOR(S)     : Annacone et al.

It is certified that error appears in the above-identified patent and that said Letters Patent is hereby corrected as shown below:

<u>Title page,</u>
Item [56], References Cited, U.S. PATENT DOCUMENTS, delete
"2,781,618    A    2/1957        Beckman et al." substitute
-- 2,781,818   A    2/1957        Beckman et al. --
OTHER PUBLICATIONS, delete
"Patent Abstracts of Japan, Vol. 1998, No. 13, November 30, 1998, and JP 10 214320A (Dainippon Printing Co., Ltd.), August 11, 1996, one page.

Patent Abstracts of Japan, Vol. 1996, No. 11, November 29, 1995, and JP 192593A (Dainippon Printing Co., Ltd.), July 30, 1995, one page." substitute -- Patent Abstracts of Japan, Vol. 1998, No. 13, November 30, 1998, and JP 10 214320A (Dainippon Printing Co., Ltd.), August 11, 1998, one page.

Patent Abstract of Japan, Vol. 1996, No. 11, November 29, 1996, and JP 08 192593A (Dainippon Printing Co., Ltd.), July 30, 1996, one page. --

Signed and Sealed this

Sixteenth Day of December, 2003

JAMES E. ROGAN
*Director of the United States Patent and Trademark Office*